(12) United States Patent
Adams et al.

(10) Patent No.: US 10,051,719 B2
(45) Date of Patent: Aug. 14, 2018

(54) TARGETS AND PROCESSES FOR FABRICATING SAME

(71) Applicant: Board of Regents of the Nevada System of Higher Education on behalf of the University of Nevada, Reno, Reno, NV (US)

(72) Inventors: Jesse D. Adams, Reno, NV (US); Grant Korgan, Reno, NV (US); Steven Malekos, Reno, NV (US); Nathalie Renard-Le Galloudec, Livermore, CA (US); Yasuhiko Sentoku, Reno, NV (US); Thomas E. Cowan, Dresden (DE)

(73) Assignee: Board of Regents of the Nevada System of Higher Education, on Behalf of the University of Nevada, Reno, Reno, NV (US)

( * ) Notice: Subject to any disclaimer, the term of this patent is extended or adjusted under 35 U.S.C. 154(b) by 286 days.

(21) Appl. No.: 15/142,628

(22) Filed: Apr. 29, 2016

(65) Prior Publication Data

US 2017/0094768 A1  Mar. 30, 2017

Related U.S. Application Data

(60) Continuation of application No. 13/839,973, filed on Mar. 15, 2013, now Pat. No. 9,345,119, which is a
(Continued)

(51) Int. Cl.
*H05H 1/24* (2006.01)
*H05G 2/00* (2006.01)

(52) U.S. Cl.
CPC .............. *H05H 1/24* (2013.01); *H05G 2/008* (2013.01)

(58) Field of Classification Search
CPC .......... H01J 3/04; H01J 2203/04; H01J 27/24; H01J 27/37; H01J 27/32339; H05H 1/22;
(Continued)

(56) References Cited

U.S. PATENT DOCUMENTS

| | | |
|---|---|---|
| 3,867,637 A | 2/1975 | Braun et al. |
| 3,992,633 A | 11/1976 | Braun et al. |

(Continued)

FOREIGN PATENT DOCUMENTS

| | | |
|---|---|---|
| EP | 1234799 | 8/2002 |
| JP | 2002004037 | 1/2002 |

(Continued)

OTHER PUBLICATIONS

Adams et al., Cone Fabrication, Nanomechanics University of Nevada, Reno, Oct. 19, 2004, 1-6.
(Continued)

*Primary Examiner* — Thomas R Artman
(74) *Attorney, Agent, or Firm* — Klarquist Sparkman, LLP

(57) ABSTRACT

In particular embodiments, the present disclosure provides targets including a metal layer and defining a hollow inner surface. The hollow inner surface has an internal apex. The distance between at least two opposing points of the internal apex is less than about 15 μm. In particular examples, the distance is less than about 1 μm. Particular implementations of the targets are free standing. The targets have a number of disclosed shaped, including cones, pyramids, hemispheres, and capped structures. The present disclosure also provides arrays of such targets. Also provided are methods of forming targets, such as the disclosed targets, using lithographic techniques, such as photolithographic techniques. In particular examples, a target mold is formed from
(Continued)

a silicon wafer and then one or more sides of the mold are coated with a target material, such as one or more metals.

21 Claims, 20 Drawing Sheets

Related U.S. Application Data division of application No. 13/418,003, filed on Mar. 12, 2012, now Pat. No. 8,750,459, which is a continuation of application No. 12/066,479, filed as application No. PCT/US2006/035267 on Sep. 12, 2006, now Pat. No. 8,229,075.

(60) Provisional application No. 60/776,268, filed on Feb. 24, 2006, provisional application No. 60/716,540, filed on Sep. 12, 2005.

(58) Field of Classification Search
CPC .. H05H 1/24; H05H 1/46; H05H 1/54; H05H 2277/13; H05H 6/00; H05G 2/008; G21B 1/03; G21B 1/19
See application file for complete search history.

(56) References Cited

U.S. PATENT DOCUMENTS

| | | |
|---|---|---|
| 4,034,032 A | 7/1977 | Hendricks |
| 4,198,283 A | 4/1980 | Class et al. |
| 4,323,420 A | 4/1982 | Masnari et al. |
| 4,381,963 A | 5/1983 | Goldstein et al. |
| 4,455,504 A | 6/1984 | Iverson |
| 4,544,520 A | 10/1985 | Farnum et al. |
| 4,618,972 A | 10/1986 | Georgiou et al. |
| 4,700,371 A | 10/1987 | Forsyth et al. |
| 5,621,780 A | 4/1997 | Smith et al. |
| 5,687,600 A | 11/1997 | Emigh et al. |
| 5,787,146 A | 7/1998 | Giebeler |
| 5,878,110 A | 3/1999 | Yamamoto et al. |
| 5,923,637 A | 7/1999 | Shimada et al. |
| 6,275,565 B1 | 8/2001 | Tomie |
| 6,332,017 B1 | 12/2001 | Carroll et al. |
| 6,464,844 B1 | 10/2002 | Piculo et al. |
| 6,594,335 B2 | 7/2003 | Davidson |
| 6,770,154 B2 | 8/2004 | Koenigsmann et al. |
| 6,969,472 B2 | 11/2005 | Vezenov et al. |
| 7,200,203 B2 | 2/2007 | Cocks et al. |
| 7,351,607 B2 | 4/2008 | Wang et al. |
| 7,555,102 B1 | 6/2009 | Renard-LeGalloudec |
| 8,229,075 B2 | 7/2012 | Cowan et al. |
| 8,530,852 B2 | 9/2013 | Le Galloudec |
| 8,750,459 B2 | 6/2014 | Cowan et al. |
| 2002/0090194 A1 | 7/2002 | Tajima |
| 2007/0019789 A1 | 1/2007 | Bloom |
| 2010/0028707 A1 | 2/2010 | Cowan et al. |
| 2012/0298624 A1 | 11/2012 | Cowan et al. |
| 2014/0030542 A1 | 1/2014 | Cowan et al. |
| 2015/0328777 A1 | 11/2015 | Malekos et al. |

FOREIGN PATENT DOCUMENTS

| | | |
|---|---|---|
| WO | WO2007/033060 | 3/2007 |
| WO | WO2009/105546 | 8/2009 |

OTHER PUBLICATIONS

Adams et al., Hemisphere Fabrication, Nanomechanics University of Nevada, Reno, Oct. 19, 2004, 1-4.
Akira, O., Manufacturing Method of Sputtering Target and Sputtering Apparatus, English abstract of JP 2002004037, Jan. 9, 2002.
Artman, Office Action dated Mar. 4, 2013 in U.S. Appl. No. 13/418,003.
Artman, Office Action dated May 18, 2011, in U.S. Appl. No. 12/066,479.
Baharlou, S., International Preliminary Report on Patentability for PCT/US2006/035267, dated Mar. 18, 2008.
Bak, J., International Search Report for PCT/US2009/034527, dated Sep. 23, 2009.
Bak, J., Written Opinion of the International Searching Authority for PCT/US2009/034527, dated Sep. 23, 2009.
Baldelli, et al., Quasi-monochromatic x-rays for diagnostic radiology, Physics in Medicine and Biolo12:v, 2003, 48:3653-3665.
Basov, N.G., et al., Conditions for heating up of a plasma by the radiation from an optical generator, Soviet Physics JETP, Jul. 1964, 19(1):123-125.
Bin, J.H., et al., Influence of the target front-surface curvature on proton acceleration in laser-foil interaction, Physics of Plasmas, Apr. 20, 2009, 16(4):043109-1 to 043109-5.
Borghesi, M., et al., Electric filed detection in laser-plasma interaction experiments via the proton imaging technique, Physics of Plasmas, May 2002, 9(5):2214-2220.
Bulanov, S.V., et al., Feasibility of using laser ion accelerators in proton therapy, Plasma Physics Reports, 2002, 28(5):453-456.
Chen, Z.L., et. AL, Enhancement of energetic electrons and protons by cone guiding of laser light, Physical Review E, Mar. 16, 2005, 71(3): 036403-1to036403-5.
Chirped pulse amplification, 5p. downloaded on Mar. 28, 2007.
Communication for EPC Application 06803322.4, dated Sep. 17, 2015, 8 pages.
Cowan, US-Japan Workshop on Fast Ignition, Nov. 17, 2004, 1-4.
Cowan, et al., X-ray imaging spectroscopy of Ti foils and pyramidal targets, 1, 2005.
Dawson, John M., On the production of plasma by giant pulse lasers, The Physics of Fluids, Jul. 1964, 7(7):981-987.
De Donnea, Conclusions of the Fusion Fast Track Experts Meeting, Dec. 5, 2001, 1-5.
Ditmire, Fusion Science Center Research at UT: Hot electron and x-ray generation from cone shaped targets, FI FSC progress Meeting, Jun. 2, 2005, 1-25.
Dunne, Mike, Laser-driven particle accelerators, Science, Apr. 21, 2006, 312:374-376.
Duvvuri, et al., Spectroscopic characterization of x-rays from laser produced plasmas: medical applications, Dec. 13, 2005, 1-28.
Dyer, et al., Pyramidal targets as an advanced radiation source in laser-solid interactions, 2005 Quantum Electronics and Laser Science Conference, 2005, 1804-1806.
European Fusion Development Agreement, "Cleaner Energy for the Future," 1-8.
European Communication, EP Patent Application 06803322.4, dated Sep. 17, 2015, 8 pages.
European Search Report, EP Patent Application 06803322.4, dated Jun. 26, 2014.
Fletcher, Daniel A., Microfabricated Silicon Solid Immersion Lens, Journal of Microelectromechanical Systems, vol. 10, No. 3, Sep. 2001, 450-459.
Flippo, K.A., et al., Increased efficiency of short-pulse laser-generated proton beams from novel flat-top cone targets, Physics of Plasmas, May 30, 2008, 15(5):056709-1 to 056709-12.
Fuchs, et al., "Demande de temps 2004 au LUU installation 100 TW," 2004, 1-12.
Fuchs, et al., "Demande de temps laser 2005 sur l'installation 100 TW dans le cadre du pro{ !famme national d'acces aux installations du LULI," 2005, 1-5.
Giffo-Schmitt, B., International Preliminary Report on Patentability for PCT/US2009/034527, Aug. 24, 2010.
Gratz, et al., Time-gated x-ray tomography, Applied Physics Letters, Nov. 16, 1998, 72(20):2899-2901.
Heck, Response filed Jul. 1, 2013, to office action dated Mar. 4, 2013, in U.S. Appl. No. 13/418,003.
Heck, Response dated Nov. 17, 2011, to office action dated May 18, 2011, in U.S. Appl. No. 12/066,479.
Heck, Supplemental response filed Nov. 17, 2011, to office action dated May 18, 2011, in U.S. Appl. No. 12/066,479.
Heck, Response filed Jan. 29, 2013, to office action dated Aug. 29, 2012, in U.S. Appl. No. 12/977,475.

(56) References Cited

OTHER PUBLICATIONS

Herrlin, et al., Generation of x-fays for medical imaging by high-power lasers: Preliminary results, Radiology, Oct. 1993, 189:65-68.
Higginson, et al., Flexible large batch production of high energy density physics targets, abstract submitted for the DPP06 meeting of The American Physical Society, Jul. 20, 2006, 1 page.
Ichalalene, et al., Image quality analysis for dual energy subtraction imaging with a femtosecond laser-based hard x-ray source, IEEE Journal on Selected Topics in Quantum Electronics, Nov./Dec. 2001, 7(6):912-917.
"Image: Chirped pulse amplification.pug," 2p., downloaded on Mar. 28, 2007.
Key, et al., "Fast Ignition: Physics progress in the US fusion energy program and prospects for achieving ignition," 2002, 1-11.
Knelp, et al., "K-spectroscopy and x-ray yield optimization of micro-shaped targets," 2005, 1.
Koenig, et al., High pressures generated by laser driven shocks: Application to planetary physics, Nuclear Fusion, Nov. 26, 2004, 44:S208-S214.
Kodama, et al., Fast heating of ultrahigh-density plasma as a step towards laser fusion ignition, Nature, Aug. 23, 2001 412:798-802.
Kodama, et al., Fast plasma heating in a cone-attached geometry—towards fusion ignition, Nuclear Fusion, Nov. 26, 2004, 44:S276-S283.
Krol, et al., Laser-based microfocused x-ray source for mammography: Feasibility study, Medical Physics, 1997, 24(5):725-732.
Landen, et al., X-ray backlighting for the National Ignition Facility, Review of Scientific Instruments, Jan. 2001, 72(1):627-634.
Lasinski, et al., Particle-in-cell simulations of short-pulse, high intensity light impinging on structured targets, Physics of Plasma, Jan. 29, 2009, 16(1):012705-1 to 012705-8.
Lazos, et al., An integrated research tool for x-ray imaging simulation, Computer Methods and Programs in Biomedicine, 2003, 70:241-251.
Lee, G., International Search Report for PCT/US2006/035267, dated Jan. 31, 2007.
Lee, G., Written Opinion of the International Searching Authority for PCT/US2006/035267, dated Jan. 31, 2007.
Nakamura et al., "Optimization of Cone Target Geometry for Fast Ignition" Oct. 11, 2007, Physics of Plasmas, vol. 14, p. 103105.
Nakamura, et al., Surface-magnetic-filed and fast-electron current-layer formation by ultraintense laser irradiation, Physical Review Letters, Dec. 20, 2004, 93(26):265002-1 to 265002-4.
Nakamura, et al., Superthermal and efficient-heating modes in the interaction of a cone target with ultraintense laser light, Physical Review Letters, Jan. 30, 2009, 102( 4):045009-1 to 045009-4.
Nakatsutsumi, et al., Reentrant cone angle dependence of the energetic electron slope temperature in high-intensity laser-plasma interactions, Physics of Plasmas, May 14, 2007, 14(5):050701-1 to 050701-4.
"New Targets for Inertial," 5p., downloaded on 2007.
Nishiuchi, et al., Focusing and spectral enhancement of a repetition-rated, laser-foil interaction, Physics of Plasmas, Apr. 20, 2009, 16(4):043109-1to043109-5.
Noda, et al., Ion production with a high-power short-pulse laser for application to cancer therapy, Proceedings of EPAC, 2002, 2748-2750.
Nuckolls, et al., Laser compression of matter to super-high densities: Thermonuclear (CTR) applications, Nature, Sep. 15, 1972, 239:139-142.
Osenbaugh-Stewart, Office Action dated Aug. 29, 2012, in U.S. Appl. No. 12/977,475.
Osenbaugh-Stewart, Notice of Allowance/Reasons for Allowance dated May 7, 2013, in U.S. Appl. No. 12/977,475.
Park, et al., High energy K(alpha) radiography using high-intensity, short-pulse lasers, Physics of Plasmas, Nov. 29, 2005, 1-37.
Patel, et al., Isochoric heating of solid-density matter with an ultrafast proton beam, Physical Review Letters, Sep. 19, 2003, 91(12):125004- 1to125004-4.

PCT International Preliminary Report on Patentability, PCT Application No. PCT/US2006/035267, dated Mar. 18, 2008.
PCT Written Opinion, PCT Application No. PCT/US2006/035267, dated Jan. 31, 2007.
Pegoraro, et al., Production of ion beams in high-power laser-plasma interactions and their application, Laser and Particle Beams, 2004, 22: 19-24.
Princeton Instruments, "High-performance x-ray imaging solutions," 2004, 1-16.
Rassuchine, et al., "The production of ultrafast bright K-alpha x-rays from laser produced plasmas for medical imaging," 2005, 1-2.
Rassuchine, "Laser-target experiments: Shot design," power point file created Apr. 6, 2006, 1-9.
Reich. et al, Yield optimization and time structure of femtosecond laser plasma K-alpha sources, Physical Review Letters, May 22, 2000, 84(21):4846-4849.
Renard-Le Galloudec, "Developments of laser targets and operations of the target fabrication laboratory," 2005, 1-4.
Renard-Le Galloudec, "Enhanced radiation sources with pyramidal target," 2005, 1.
Renard-Le Galloudec, et al., Developments of laser targets and operations of the target fabrication laboratory, Nevada Terawatt Facility Annual Report, 2006, 4 pages.
Renard-Le Galloudec, et al., Controlled reproducible alignment of cone targets and mitigation of preplasma in high intensity laser interactions, Review of Scientific Instruments, Aug. 25, 2008, 79(8):083506-1 to 083506-4.
Renard-Le Galloudec, et al., Guiding, focusing, and collimated transport of hot electrons in a canal in the extended tip of cone targets, Physical Review Letters, May 20, 2009, 102(20):205003-1 to 205003-4.
Renard-Le Galloudec, et al., New micro-cones targets can efficiently produce higher energy and lower divergence particle beams, Laser and Particle Beams, 2010, 28:513-519.
Reyntjens, et al., Focused ion beam induced deposition: Fabrication of three dimensional microstructures and Young's modulus of the deposited material, Journal of Micromechanics and Microengineering, 2000, 10:181-188.
Roth, et al., Fast ignition by intense laser-accelerated proton beams, Physical Review Letters, Jan. 15, 2001, 86(3):436-439.
Roth, et al., Energetic ions generated by laser pulses: A detailed study on target properties, Physical Review Special Topics—Accelerators and Beams, Jun. 4, 2002, 5(6):061301-1 to 061301-8.
Roth, et al., The generation of high-quality, intense ion beams by ultra-intense lasers, Plasma Physics and Controlled Fusion, Nov. 2, 2002, 44:B99-B108.
Rousse, et al., Efficient K-alpha x-ray source from femtosecond laser-produced plasmas, Physical Review, Sep. 1994, 50(30):2200-2207.
Schollmeier, et al., Controlled transport and focusing of laser-accelerated protons with miniature magnetic devices, Physical Review Letters, Aug. 1, 2008, 101(5):055004-1 to 055004-4.
Sentoku, et al., Laser light and hot electron micro focusing using a conical target, Physics of Plasmas, Jun. 2004, 11(6):3083-3087.
Sentoku, et al., Isochoric heating in heterogeneous solid targets with ultrashort laser pulses, Physics of Plasmas, Dec. 4, 2007, 14(12):122701-1 to 122701-6.
Sjogren, et al., High-repetition-rate, hard x-ray radiation from a laser-produced plasma: Photon yield and application considerations, Review of Scientific Instruments, Apr. 2003, 74(4):2300-2311.
Snavely, et al., Laser generated proton beam focusing and high temperature isochoric heating of solid matter, Physics of Plasmas, Sep. 21, 2007, 14(9):092703-1 to 092703-5.
Spencer, et al., Laser generation of proton beams for the production of short lived positron emitting radioisotopes, Nuclear Instruments and Methods in Physics Research B, 2001, 183:449-458.
Strzelecka, Eva M., Monolithic Integration of VCSELs and Detectors with Refractive Microlenses for Optical Interconnects, UMI, Dec. 1997, 156 pages.
Svanberg, Some applications of ultrashort laser pulses in biology and medicine, Measurement Science and Technology, 2001, 12:1777-1783.

(56) References Cited

OTHER PUBLICATIONS

Tabak, et al., Ignition and high gain with ultrapowerful lasers, Physics of Plasmas, May 1994, 1 (5): 1626-1634.
Tanaka, et al., Basic and integrated studies for fast ignition, Physics of Plasmas, May 2003, 10(5):1925-1930.
"Ti-sapphire laser," 3p., downloaded on Mar. 28, 2007.
Tonican, et al., Ultrafast laser-driven microlens to focus and energy-select megaelectron volt protons, Science, Apr. 21, 2006, 312:410-413.
Toth, et al., In-line phase-contrast imaging with laser-based hard x-ray source, Review of Scientific Instruments, 2005, 76:083701-1 to 083701-6.
Tummler, et al., High-repetition-rate chirped-pulse-amplification think-disk laser system with joule-level pulse energy, Optics Letters, Apr. 22, 2009, 34(9):1378-1380.
Wilks, et al., Energetic proton generation in ultra-intense laser-solid interactions, Physics of Plasmas, Feb. 2001, 8(2):542-549.
Yogo, et al., Application of laser-accelerated protons to the demonstration of DNA double-strand breaks in human cancer cells, Applied Physics Letters, May 7, 2009, 94(18):181502-1 to 181502-3.
Yu, et al., High magnification imaging with a laser-based hard x-ray source, IEEE Journal of Selected Topics in Quantum Electronics, Jul./Aug. 1999, 5(4):911-915.
Examination Report, EP Patent Application No. 06803322.4, dated Dec. 13, 2017, 4 pages.
Response to Offical Communication, EP Patent Application No. 06803322.4, filed Jun. 30, 2016, 25 pages.

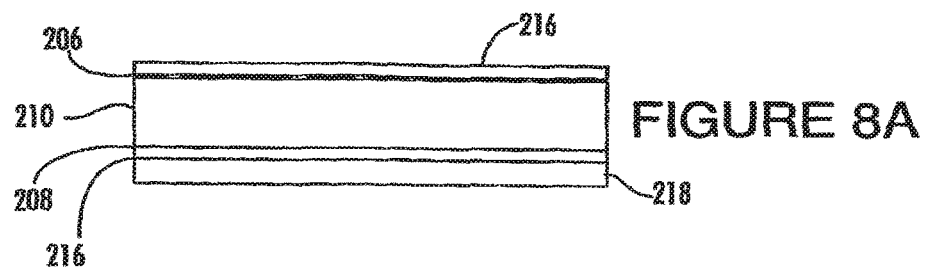
FIGURE 8A
FIGURE 8B
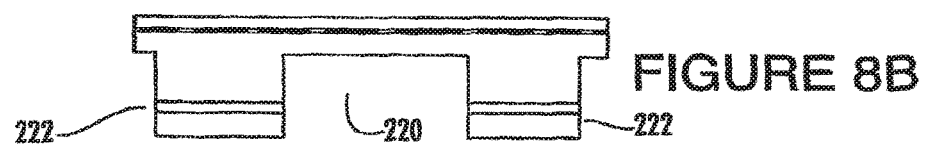
FIGURE 8C
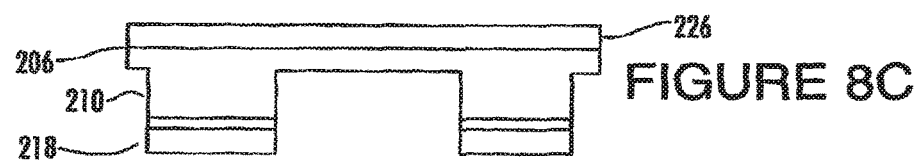
FIGURE 8D
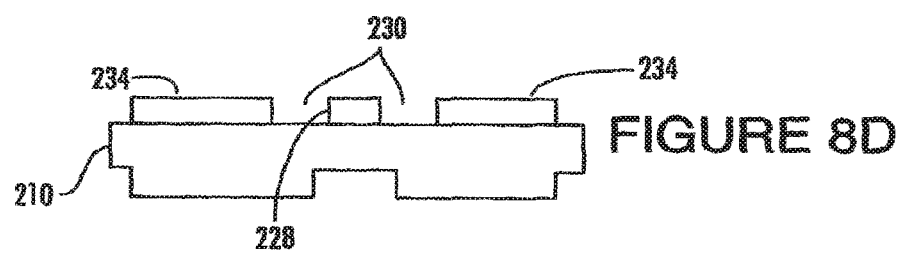
FIGURE 8E

TARGETS AND PROCESSES FOR FABRICATING SAME

CROSS REFERENCE TO RELATED APPLICATIONS

This application is a continuation of U.S. patent application Ser. No. 13/839,973, filed Mar. 15, 2013, which in turn is a divisional of U.S. patent application Ser. No. 13/418,003, filed Mar. 12, 2012, now U.S. Pat. No. 8,750,459, which in turn is a continuation of U.S. patent application Ser. No. 12/066,479, now U.S. Pat. No. 8,229,075, filed Mar. 11, 2008, which is the U.S. National Stage of International Application No. PCT/US2006/035267, filed Sep. 12, 2006, which was published in English under PCT Article 21(2), which in turn claims the benefit of, and incorporates by reference, U.S. Provisional Patent Application No. 60/716,540 filed Sep. 12, 2005, and 60/776,268, filed Feb. 24, 2006. Each of these applications is incorporated by reference herein in its entirety.

GOVERNMENT SUPPORT

This invention was made with government support under grant DE-FC52-01NV14050 awarded by the United States Department of Energy. The government has certain rights in the invention.

TECHNICAL FIELD

The present disclosure relates to targets and their methods of fabrication. In particular examples, the present disclosure provide methods of fabricating metal targets useable as laser targets in high-energy laser-physics.

BACKGROUND

Metal covered targets are typically used in high energy physics applications. For examples, such targets may be shot with a laser in order to generate plasmas or high energy radiation. Such targets may be used in applications such as inertial confinement fusion.

Targets for lasers used to produce plasma and radiation typically have disadvantages. For example, conventional targets are often produced by micro-machining processes that typically produce targets having a tip sharpness, or apex dimensions, of 25 μm or larger. For example, a current process involves micro-machining a mandrel, electroplating the mandrel with a desired metal, and then etching away the mandrel. Other processes involve depositing a metal layer on a plastic mold and then melting away the plastic mold. The tips of targets produced by such processes can be significantly larger than the wavelength of the laser light that will be used with the target and therefore may not produce optimal energy. Similarly, the apexes, or tips, of the targets can be larger than the focal size (or spot size) of the laser, which can minimize any enhancements that might otherwise be conferred by the target shape.

In addition, such targets are typically manufactured individually and thus can be comparatively expensive. The expense of the targets may limit the number of targets available for use, thus potentially limiting how the targets can be used. For example, a limited number of targets available for a series of experiments may limit the quality or quantity of data obtained during the experiments.

The amount of material available on such targets or irregularities in the target surface may interfere with full characterization of the produced plasma. Insufficient target material may also interfere with optimal energy production.

Some prior experiments have used metal coated silicon targets. However, the silicon included in such targets typically interferes with energy focusing and radiation enhancement.

While hemispherical laser targets have been tested, such targets typically suffer from disadvantages in addition to those noted above. For example, irregularities in the surface of the target, or variations in the targets resulting from their method of manufacture, may make it difficult to properly position the target and position other objects with respect to the target.

SUMMARY

The present disclosure provides hollow targets having a metal layer and any combination of straight or curved surfaces and an internal apex of less than about 15 μm, such as less than about 10 μm. In specific examples, the internal apex is less than about 1 μm. In particular embodiments, the metal targets are free-standing. In further embodiments, the targets are arranged in arrays. Some disclosed targets are surrounded by a protective frame or a structure that aids in manipulating the targets.

The present disclosure also provides methods of lithographically fabricating targets, including the above-mentioned targets having an internal apex of less than about 15 μm. A particular method of the present disclosure provides for forming a free-standing pyramid-shaped target. An aperture is formed in a front side of a masked silicon wafer. The front side of the silicon wafer is etched along diagonal planes to form a pyramidal void. A layer of a target material, such as a metal, is then formed on the surface of the pyramidal void. In particular examples, the target material is selected from Au, Pt, Cr, Cu, Pd, Ta, Ag, Ti, W, silicon nitride, and polysilicon. In some instances, an adhesion layer is formed prior to forming the target material layer. A back side of the silicon wafer is etched to expose a surface of the target material.

In a particular implementation, a thin layer, such as less than 2 μm, of a first target material is formed on the pyramidal void and then a second target material is deposited on the target, such as on the back side of the first target material once the back surface has been exposed as described above.

In another embodiment, the present disclosure provides a method of forming a conical target. A thin film, such as about 1000 Å of $SiO_2$ is deposited on a silicon wafer, such as double polished silicon. A thin layer of silicon nitride, such as about 1000 Å, is then deposited on the $SiO_2$ layer. Standard photolithography techniques are used to form an opening, such as an opening of at least about 400 μm, on one surface of the wafer. The surface is etched to form a conical void under the opening.

An opening, such as an opening of at least about 400 μm formed in the opposing surface of the wafer. An etch is performed in the opening in the opposing surface of the wafer until all sides converge at the tip of the pyramid formed in the surface of the wafer, making an outer pyramid-shaped silicon mold. In certain examples, standard oxide sharpening techniques are used to create a sharper tip. A metal coating, such as a coating of at least about 1.5 μm, is deposited on the pyramidal void to create a pyramidal metal structure. In particular examples, a second metal is deposited on top of the first metal. The silicon mold is then etched away from the back surface of the silicon wafer to create a hollow free-standing metal pyramid or hollow pointed metal target. In specific examples, the target has an internal apex of less than 1 µm. Other shapes may be formed using the disclosed methods, such as cones.

Further embodiments provide methods of forming hemispherical targets. A backside of a silicon wafer is coated with photoresist. At least one aperture is formed in the backside and the backside is etched. The backside photoresist is then removed and the front side of the wafer is coated with photoresist. Apertures are then formed in the front side of the wafer using standard techniques and the remaining photoresist formed into domes using acetone reflow. The front side is then etched to remove both silicon and photoresist and transfer the dome shaped to the silicon wafer. A metal layer is then formed on the front side of the wafer.

The presently disclosed hemispherical targets can provide advantages over previous targets. For example, the disclosed fabrication techniques can allow the surface, such as the lens diameter and radius of curvature, of the target to be controlled and tailored for a particular application. Knowing the curvature and other dimensions of the target can aid both in positioning the target and positioning other objects with respect to the target.

Yet further embodiments of the present disclosure provide capped or topped targets, such as conical or pyramidal targets having a top extending horizontally from the apex of the conical or pyramidal target. The tops can have various shapes, including square, circular, rectangular, parallelogram, hexagonal, pentagonal, elliptical, cross shaped, or an arbitrary shape. In some implementations, the cap is made of a single metal. In further embodiments, the cap includes multiple metals. The metals can have the same or different shapes or thicknesses. In one particular example, the cap includes concentric circles of various metals. In a further example, the cap includes a first metal layer covered with a polka dot pattern of a second metal. In some configurations the cap is hollow while in other configurations the cap is solid.

In some implementations, the target is attached to a base piece by a support structure. In a particular example, the support structure is a horizontal extension of a cap portion. In more particular examples, openings are formed in the support arm. Attachment to a base piece can allow for easier manipulation of the target.

Capped targets can provide a number of advantages, including a larger or more regular surface area, which may allow resulting plasma or other emissions to be characterized or allow more energy to be produced. The ability to use different metals, in the base and cap or either the base or cap, can aid in tailoring the type of energy emitted from the target.

The present disclosure provides methods for fabricating capped targets. According to a disclosed method, a film of mask material, such as silicon dioxide, is deposited on both sides of a silicon wafer. An aperture is etched into the backside of the wafer. Standard photolithography techniques are used to create a target opening of a suitable size and shape for the cap of the target. One or more metal layers, or other target material, are then deposited in the target opening. Extraneous metal can be removed, such as by using standard lift-off techniques.

Apertures flanking the metal layers are created using standard photolithography techniques. The etch process is stopped short such that a target base, such as a conical or pyramidal target, is left supporting the metal cap. A layer of metal, or mask material, is then deposited on the front side of the wafer and the rear side of the wafer etched to remove silicon from the inside of the target base. If desired, the front side mask material can then be removed.

The disclosed methods can allow targets to be fabricated more cheaply, easily, consistently, or controllably than prior methods. Particular methods can allow targets to be mass fabricated. In a particular example, arrays of targets can be fabricated. The availability of greater numbers of targets, or greater varieties of targets, can allow the targets to be used in new applications, as well as potentially increasing the quality or quantity of data obtainable from experiments using the targets.

The sharp, often submicron, dimensions of the inside apex or tip of the conical, pyramid, hemispherical, or otherwise hollow metal targets can significantly enhance the brightness for emitted radiation, such as x-rays, and the amount of particles produced. When the laser light gets focused, after the focusing optic, it can be further focused by the inner surface of the disclosed targets. In some cases, such focusing produces more energy or may allow pointing requirements for the laser to be relaxed.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which:

FIGS. 8A through 8I are cross sectional diagrams illustrating a process for forming hemispherical targets according to the present disclosure.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. Although methods and materials similar or equivalent to those described herein can be used in the practice or testing of the present disclosure, suitable methods and materials are described herein. The disclosed materials, methods, and examples are illustrative only and not intended to be limiting.

Conical and Pyramidal Targets

Referring first to FIGS. 1A through 1L, cross sectional diagrams show the progressive processing for forming targets according to variations of a first aspect of the present disclosure.

Figure 1A:
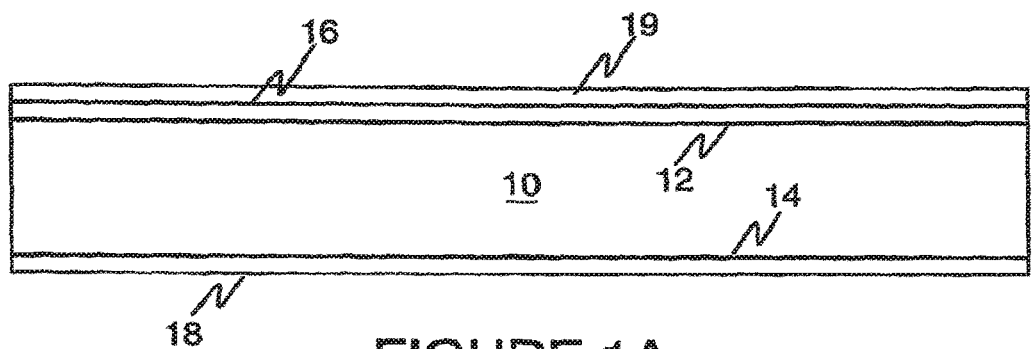
FIGS. 1A through 1L are cross sectional diagrams illustrating a process for forming targets according to variations of a first aspect of the present disclosure.

Referring now to FIG. 1A, the submicron-tip pyramid-shaped target is formed on a silicon wafer 10, such as a wafer 10 having a <100> crystal orientation. In a particular example, the wafer 10 is about 525 µm thick. First, both the front side 12 and back side 14 of the wafer 10 are blanket coated with about 1000 angstroms of silicon nitride 16 and 18, respectively, using standard semiconductor processing techniques. The silicon nitride layer is double polished and then about 1.6 µm of photoresist 19, such as Shipley 3612, is deposited on the front side silicon nitride layer 16. In a particular example, the wafer 10 is primed with Hexamethyldisilazane (HMDS) before applying the photoresist. The wafer 10 is then soft baked at 90° C. Although a silicon nitride mask material is described, other mask materials, such as silicon dioxide, may be used if desired.

Figure 1B:
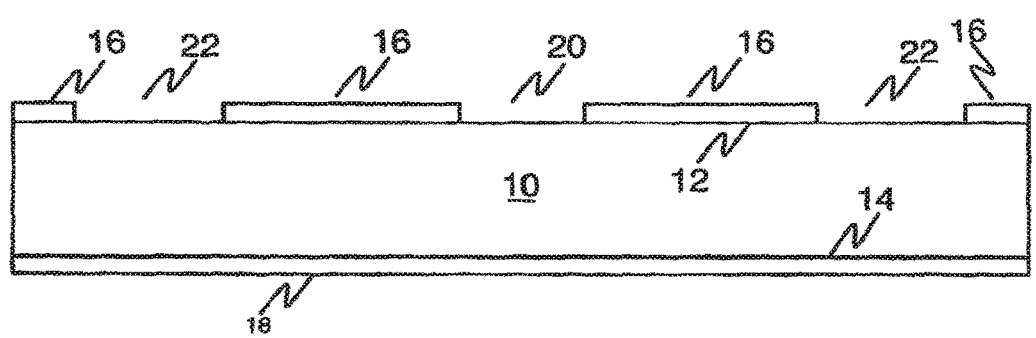

Referring now to FIG. 1B, the front side 12 of the wafer 10 is patterned using conventional photolithography techniques, such as by exposing the wafer 10 to the desired mask pattern for a suitable period of time, such as about 1.7 seconds. In some examples, the wafer 10 is developed using LDD26W (available from Shipley Co.) developer and a 110° C. postbake. The silicon nitride is etched using standard semiconductor processing techniques, such as using a RIE (reactive ion etch) dry etch for 4 minutes, to clear the target window 20 and release-tab windows 22. In a particular example, the etch rate is about 300 Å/m. In a particular example, the RIE employs a mixture of $SF_6$ and $O_2$. Remaining photoresist can be stripped by a suitable process, such as a standard $O_2$ etch. FIG. 1B shows the structure resulting after these processing steps have been performed.

Figure 1C:
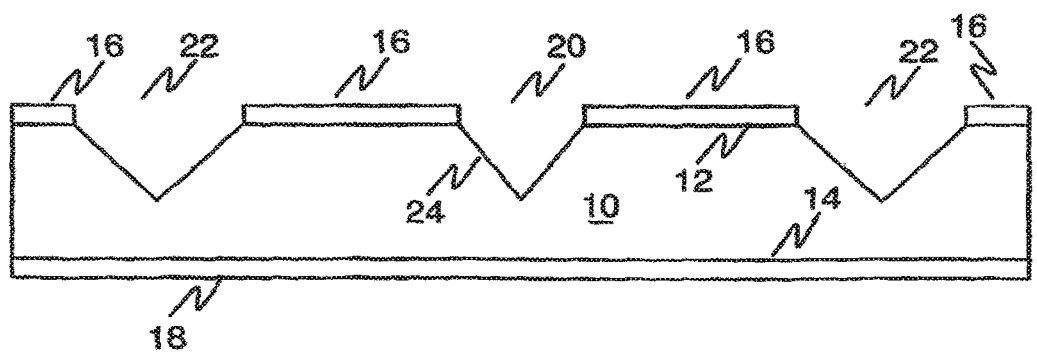

Referring now to FIG. 1C, the target window 20 and the release-tab windows 22 are etched to a depth of just over about 400 microns to form a pyramid-shaped target depression 24 using silicon nitride layer 12 as a mask. For a square target window measuring about 500 microns on a side, a nominal etch time of about 5 hours in KOH with a 1 hour over-etch time is used. In a particular example, the etch is performed at about 90° C. The object is to etch until the crystal planes in the target window 20 intersect or converge. The etch process is continued until substantially all of <100> plane has been etched away (see FIGS. 4A through 4D, particularly FIG. 4D), resulting in the intersection at a point of the planes comprising the pyramidal surfaces of the completed etch pit in order to achieve submicron tip resolution in the target window 20. With a 500 micron wide target window 20, the completed etch depth will be about 400 microns. The angle of the pyramidal void formed will be about 70.6° using this etch process. Slower etch rates typically yield smoother sidewalls. Appropriate KOH decontamination procedures are performed as is known in the art, such as treatment with 5:1:1 $H_2O:H_2O_2:HCl$. Organics can be stripped using suitable techniques, such as treatment with 9:1 $H_2SO_4:H_2O_2$. FIG. 1C shows the structure resulting after these processing steps have been performed.

Appropriate selection of etch conditions can be used to control the shape of the target window 20. For example, while KOH produces pyramidal targets having a target pyramidal angle of 70.6°, adding a nonionic surfactant to TMAH (Tetra Methyl Ammonium Hydroxide) and using {110} silicon, conical windows 20, with a cone angle of 90°, can be formed.

Figure 1D:
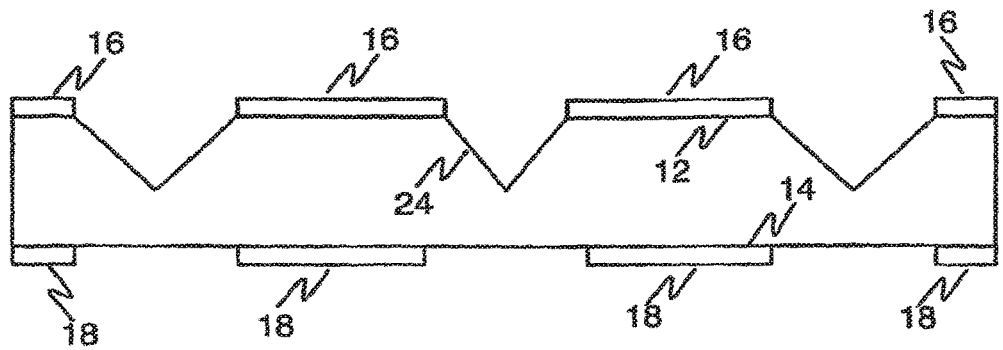

Referring now to FIG. 1D, the back side 14 of the wafer 10 is patterned using conventional photolithography techniques, such as being spun with Shipley 3612 or Shipley 220 photoresist and exposed and developed using a suitable backside mask. In a particular example, the backside 14 is coated with about 4 µm of photoresist after a HMDS prime and then the wafer is soft baked at 90° C. In a further example, the backside 14 is exposed with the mask for about 4.5 seconds, developed with LDD26W developer, and not postbaked. The silicon nitride layer 18 on the back side of wafer 10 is etched using standard silicon nitride etching techniques, such as the RIE process for 4 minutes, to clear the back side etch windows 26. In another example, the nitride etching process is performed in about 2.5 minutes. FIG. 1D shows the structure resulting after these processing steps have been performed.

Figure 1E:
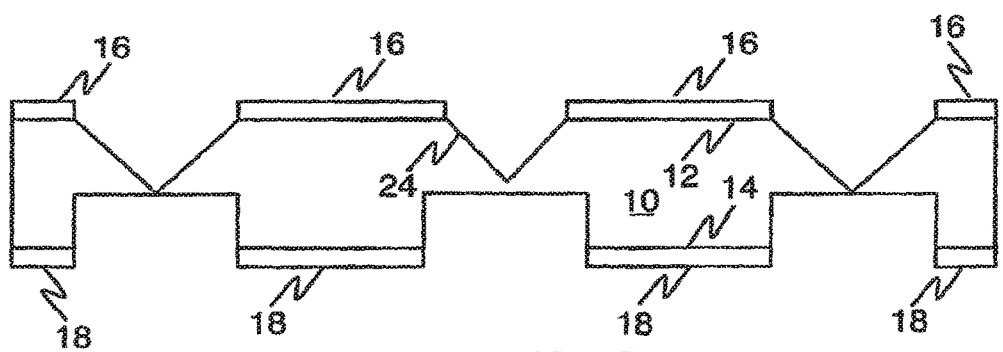

Referring now to FIG. 1E, the back side 18 of the silicon wafer 10 is etched in an anisotropic dry etching process using silicon nitride layer 18 as a mask. In a particular example, an STS dry etch is used (Surface Technology Systems, plc. of Newport, UK). About 80-90 microns of material is removed. The etching process is stopped short of exposing the tips of the target depressions. In a particular example, the STS etch is performed over a period of about 25 minutes. Photoresist and organics can then be stripped, such as by using 9:1 $H_2SO_4:H_2O_2$. FIG. 1E shows the structure resulting after these processing steps have been performed.

Figure 1F:
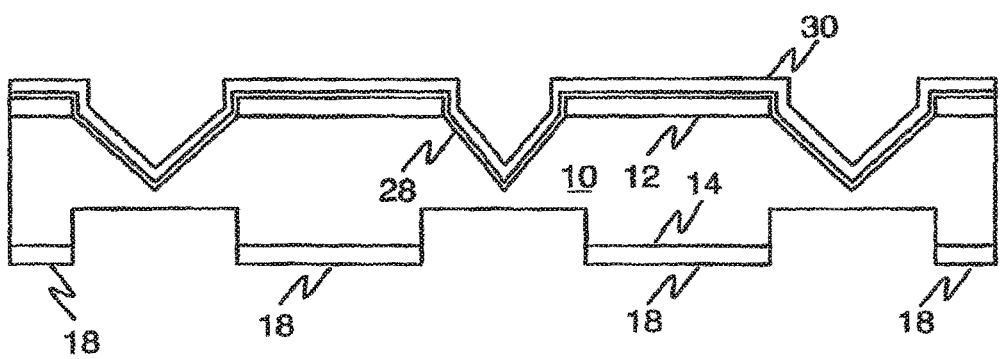
Figure 1G:
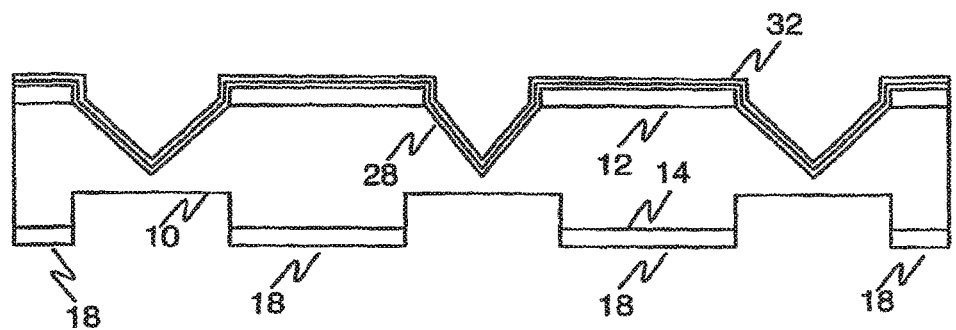

Next, depending on whether or not a submicron tip is needed, the processing shown in either FIG. 1F or 1G is performed. If a submicron tip is not desired, the processes of FIG. 1F are performed.

Referring now to FIG. 1F, an adhesion layer 28 is blanket deposited on the front side of the wafer 10 using, for example, e-beam evaporation and thermal evaporation or sputtering. A metal such as Ti is satisfactory for use as the adhesion layer. Other materials may be used depending on their compatibility with the metal layer that is to be used to form the target. A thickness of about 100 angstroms has been found to be satisfactory for the adhesion layer.

Next, a layer of a target material 30 is blanket deposited over the adhesion layer 28 using e-beam or thermal evaporation, sputtering or electroplating techniques. This layer may be from about 8 to about 10 microns in thickness, in particular examples. In further implementations, the layer is at least about 8 microns thick. A thickness of 1.7 microns has been found to be satisfactory. FIG. 1F shows the structure resulting after the adhesion layer 28 and the 10-micron thick target-material layer 30 have been deposited. If a 10-micron thick layer of target material is deposited, the target material may form a meniscus at the bottom of the pyramid-shaped target depression 24, which may cause the tip not to have submicron dimensions, although the target formed may still be useful for certain applications.

The target material may be any material that is suitable for use as a target in the procedure that will employ the target of the present disclosure. Materials including metals such as Au are suitable materials, although other metals and other known target materials may be employed. The target material may be deposited using known methods suitable for forming such target materials such as CVD, LPCVD, evaporation, sputtering, electroplating and other known materials processing methods. Persons of ordinary skill in the art will appreciate that, depending on the composition of the target material and the degree of its adhesion to the substrate material, the adhesion layer 28 may not be necessary.

If it is desired to form a submicron tip, the processing shown in FIG. 1G is performed. Referring now to FIG. 1G, an adhesion layer 28 is blanket deposited on the front side of the wafer 10 using, for example, e-beam evaporation. This is the same adhesion layer that would have been formed if the processing indicated in FIG. 1F had been performed. A thickness of about 100 angstroms has been found to be satisfactory for this layer. Next, a layer of target material 32 is blanket deposited over the adhesion layer 28 using e-beam and thermal evaporation or sputtering techniques. However, unlike the processing illustrated with reference to FIG. 1F, the thickness of the target-material layer 32 may be from about 1.5 microns to about 2 microns. A thickness of 1.7 microns has been found to be satisfactory. FIG. 1G shows the structure resulting after the adhesion layer 28 and the 1.5 to 2 micron target-material layer 32 have been deposited.

Figure 1H:
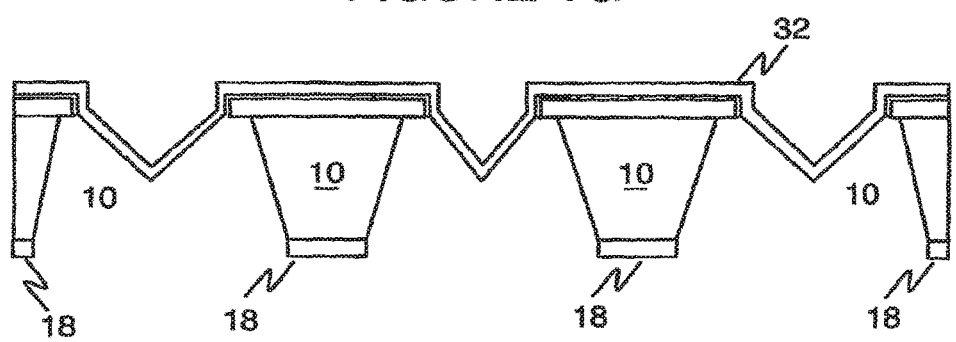

Referring now to FIG. 1H, the back side 18 of wafer 10 is etched using a suitable etchant (such as KOH at 90° C.) to expose the target-material layer 30, now a freestanding pyramid, and the wafer 10 is suitably decontaminated. The target-material layer 30 acts as an etch stop and, depending on its composition, the adhesion layer may be removed by the etchant. In the case of Ti adhesion layer and Au target material, KOH will perform well. Care should typically be taken to ensure that the wafer 10 is not over-etched, as this can cause the target to release from the wafer 10. In a particular example, the KOH etch is performed for about 100 minutes, such as to etch about 150 µm. Similarly, care should be used in performing KOH decontamination steps (such as using 5:1:1 $H_2O:H_2O_2:HCl$) to avoid release of the targets.

Figure 1I:
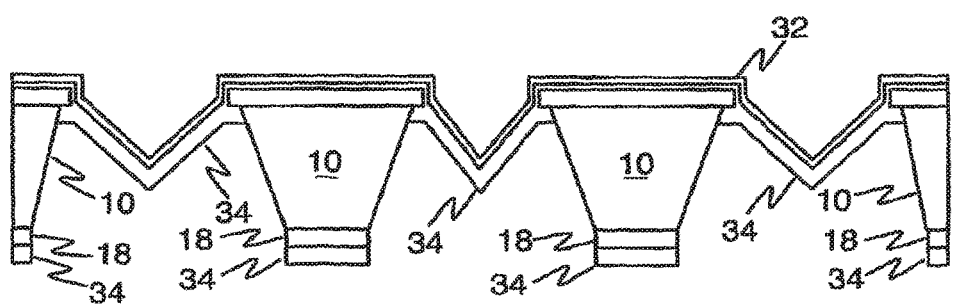

Referring now to FIG. 1I, a layer of target material 34 is deposited on the back side of the wafer. This layer 34 may be about 8-10 microns thick, in particular examples. An adhesion layer, such as a Ti adhesion layer, may be used if desired. The processing steps referred to with respect to FIG. 1I are not performed if the processing steps referred to with reference to FIG. 1F are performed, since a thicker layer of target material that is capable of free standing by itself is already present in the structure.

Figure 1J:
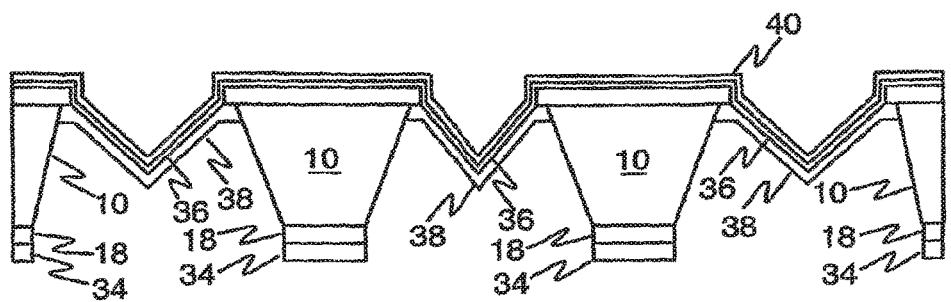

According to one variation of the present disclosure illustrated with reference to FIG. 1J, a multiple-metal target may be formed. According to this embodiment of the disclosure, instead of depositing a single layer 34 of target material as shown in FIG. 1I, a thin film 36 (e.g., having a thickness in the range of between about 0.1 µm up to 10 µm, such as from 0.5 µm to 2 µm) of a target material such as a metal is first coated onto the exposed Ti surface 28. In particular examples, evaporation is used as the deposition method since evaporation will line-of-sight deposit the material, focusing the deposition at the apex. In further examples, the metal is coated using sputtering or electroplating. Next, a layer 38 of Au is deposited on the back side of the wafer over layer 34 to a thickness of about, for example, 10 microns. FIG. 1J shows the structure resulting after the Au layer 38 has been deposited.

Figure 1K:
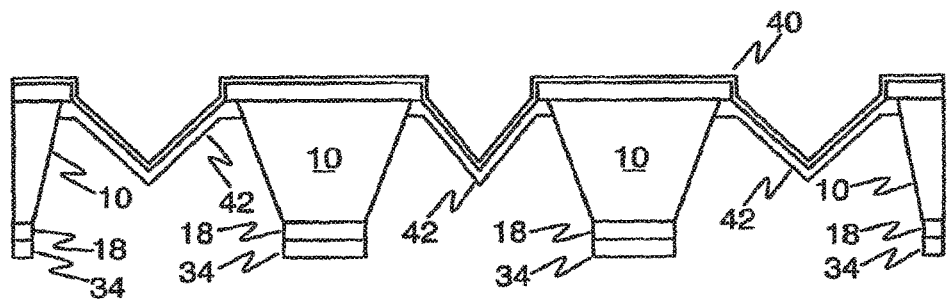

According to another variation of the present disclosure, the submicron-tip pyramid-shaped target of the present disclosure may be formed in a process that employs a sacrificial layer for use in forming the target. This aspect of the present disclosure employs the process as illustrated in FIGS. 1A through 1E to the point where the back side 18 of the silicon wafer 10 has been etched, stopping short of exposing the tips of the target depressions. Then, as illustrated in FIG. 1K, a sacrificial layer 40 of a material such as silicon nitride, polysilicon, Mo, Ni, Pd, Pt, Cu or Ag, or other material that will withstand the subsequent etch back step, is deposited on the front side of the wafer and into the target depressions. In a particular example, the sacrificial layer is a 2 µm layer of silicon nitride.

The back side of the wafer is then further isotropically etched to expose the lower surface of the sacrificial material serving as the freestanding pyramid mold. In a particular example, a KOH wet etch is used and the wafer suitably decontaminated after the etching step.

FIG. 1K shows the structure resulting after the back side of the sacrificial layer has been exposed by the etching step. The sacrificial layer can be preferentially etched away thereby leaving layer 42 as the only freestanding metal structure.

A different metal than the desired device metal can be used to act as the sacrificial freestanding mold and then later removed. Mo, Ni, Pd, Pt, Cu, Ag or highly doped silicon will work, as they are all impervious to the KOH solution and may be selectively etched away later on in the process. Once the sacrificial mold is freestanding, the desired metal can be deposited to the backside of the sacrificial freestanding mold. In the case of Ni as the sacrificial mold and Au as the desired device material; the Ni will etch away in a standard wet etch known in the art as Piranha etch and it will not affect the gold (all metals described above as the sacrificial mold will etch in Piranha solution, but gold will not). What is left will be a freestanding gold device that has even a sharper inside apex, as no apex resolution is lost because all of the metal from the inside deposition that collected at the tip of the silicon mold will be removed.

In this process, the freestanding metal structure can be used as the temporary freestanding mold and then later removed, allowing only the metal that was deposited to the backside remain as the freestanding device. This process can provide a number of advantages. The process can allow sharper inside apexes to be formed and can result in targets which are less expensive to manufacture.

Figure 1L:
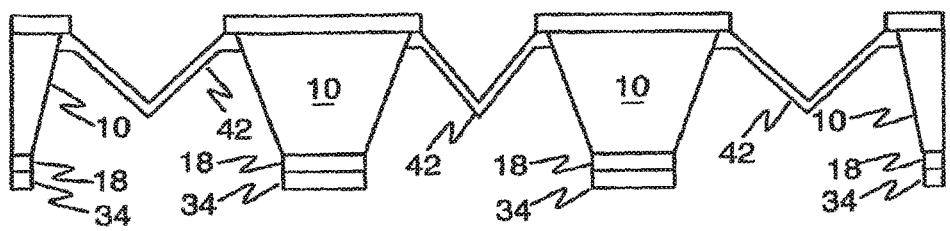

Next, as illustrated in FIG. 1L, a layer 42 of desired target material is then deposited, such as by sputtering or evaporation. This material may be, for example, a layer of Au having a thickness of about 10 microns, or a layer of another target material. The sacrificial layer is then removed using an etching process that differentiates between the target material layer 42 and the sacrificial layer 40. FIG. 1L shows the structure resulting after the sacrificial layer has been removed, leaving the free-standing pyramidal target.

Figure 2A:
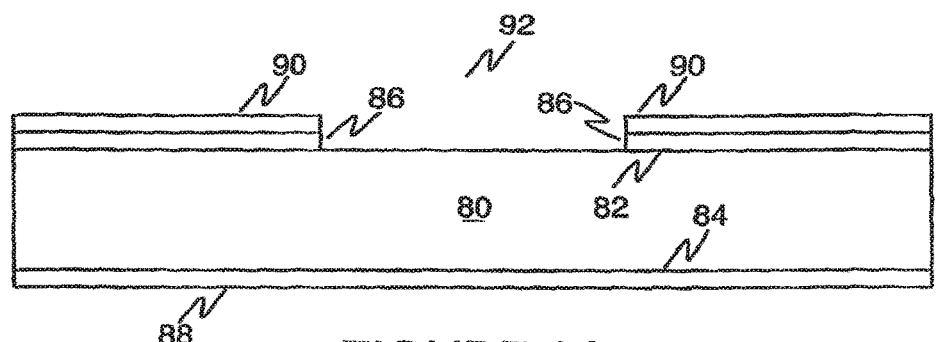
FIGS. 2A through 2H are cross sectional diagrams depicting a process for forming targets according to variations of a second aspect of the present disclosure.

Referring now to FIGS. 2A through 2I, another aspect of the present disclosure is illustrated. Referring now to FIG. 2A, a silicon wafer 80 has its front side 84 and back side 86 covered with deposited silicon nitride layers 86 and 88, respectively. A layer of photoresist 90 is formed and patterned on the front side 82 of the wafer 80 to form an aperture 92. The portion of silicon nitride layer 86 in aperture 92 is etched away to expose the front side 82 of wafer 80 as shown in FIG. 2A. The photoresist layer 90 is then stripped using conventional processing techniques.

Figure 2B:
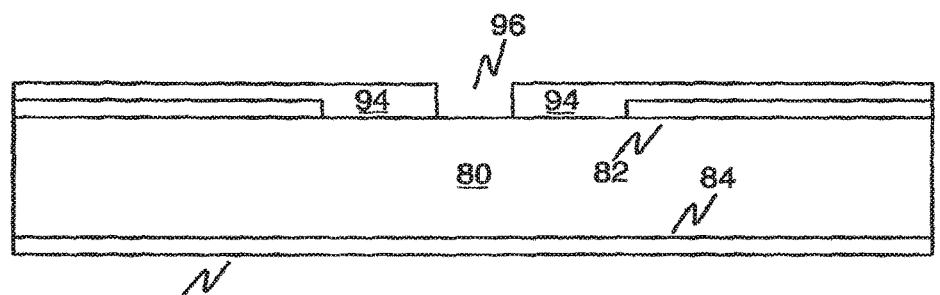

Referring now to FIG. 2B, another layer of photoresist 94 is applied to the front side 82 of wafer 80 and patterned to form aperture 96 within the region from which the front side silicon nitride layer 86 has been removed. FIG. 2B shows the structure resulting after these processing steps have been performed.

Figure 2C:
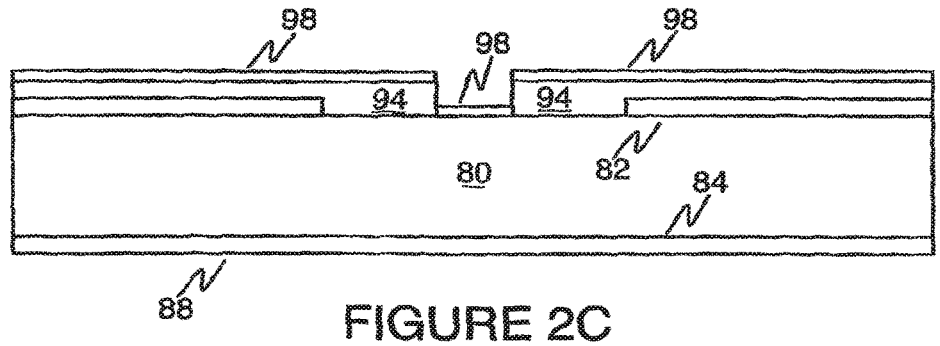

Referring now to FIG. 2C, a metal layer 98 is deposited on the front surface of the wafer, both over photoresist layer 94 and over the exposed portion of the front side 82 of wafer 80 in aperture 96. About 3,000 angstroms of gold has been found to be satisfactory for this purpose although persons of ordinary skill in the art will appreciate that other metals and other thicknesses will also function for this layer. FIG. 2C shows the structure resulting after metal layer 98 has been deposited.

Figure 2D:
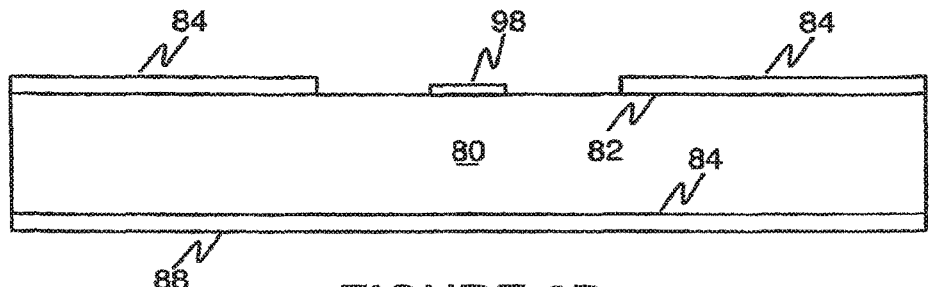

Referring now to FIG. 2D, a standard metal liftoff procedure is performed to remove the unnecessary metal above the photoresist layer 94 as well as the photoresist layer 94, leaving the portion of gold layer 96 and silicon nitride layer 84 deposited on the front surface 82 of wafer 80. FIG. 2D shows the structure resulting after the unnecessary portions of metal layer 98 and all of the photoresist layer 94 has been removed.

Figure 2E:
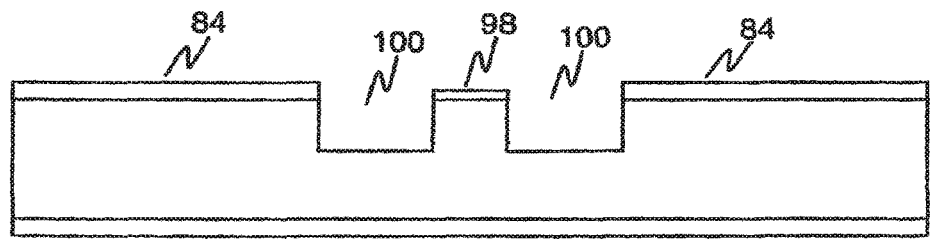

Referring now to FIG. 2E, a DRIE anisotropic silicon etch is performed, using a process such as the Bosch process in an STS etcher. As will be appreciated by persons of ordinary skill in the art, the Bosch process is a dry etch performed with the sidewalls passivated with a polymer from the dry etch chemistry, which allows deep, highly anisotropic etching (e.g., at ratios such as 150:1) into the surface of the silicon. This etch may be performed to a depth of 150 μm to 250 μm, such as to about 200 μm, with a width of the metal layer 98 of 250 microns to 350 μm, such as to about 300 μm. FIG. 2E shows the structure resulting after the anisotropic etching step has been performed, including the voids 100 formed by removing portions of the wafer.

Figure 2F:
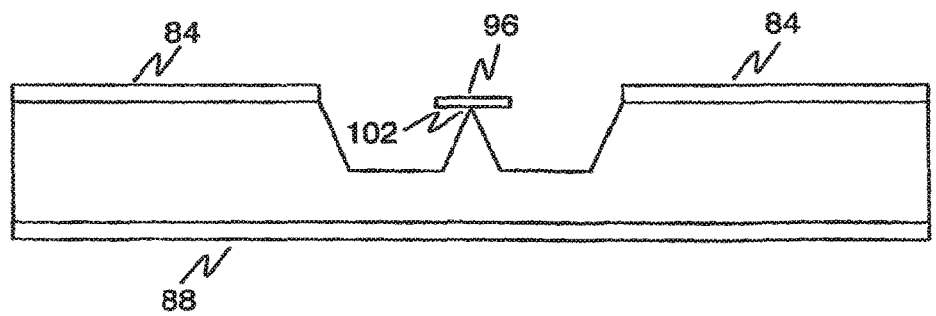

Referring now to FIG. 2F, the tip 102 of the target to be formed is defined using an anisotropic wet or dry isotropic silicon etching technique. The etching process will undercut the region of the silicon wafer underlying metal layer 98, causing the tops of the sidewall edges to form a submicron featured point 102 as they meet from opposite sides as shown in FIG. 2F. Metal layer 98 will be removed as a result of this etching process.

Figure 2G:

Referring now to FIG. 2G, a metal layer 104 is formed over the exposed front surface 82 of the wafer 80. In one embodiment of the disclosure, the metal layer 104 is a layer of Au formed to a thickness of about 1.7 μm. Next a layer 106 of another metal, such as Ti, Cu, or Ag, is formed to a thickness from 100 nm to 8 μm. Finally, another Au layer 108 may be formed to a thickness of about 1 μm. The thicknesses of layers 104, 106, and 108 are not critical.

Figure 2H:
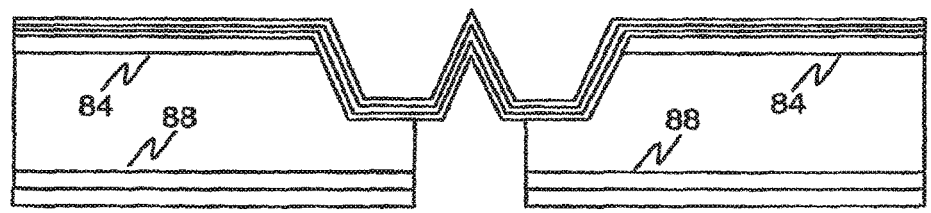

Referring now to FIG. 2H, a photomask layer 110 is formed over the back side 84 of wafer 80 and exposed to form aperture 112 aligned with the tip of the metal layer. An anisotropic silicon etching process is performed to remove all of the silicon material disposed below metal layer 104 in the aperture 100. The masking layer 110 is then removed.

Figure 3:
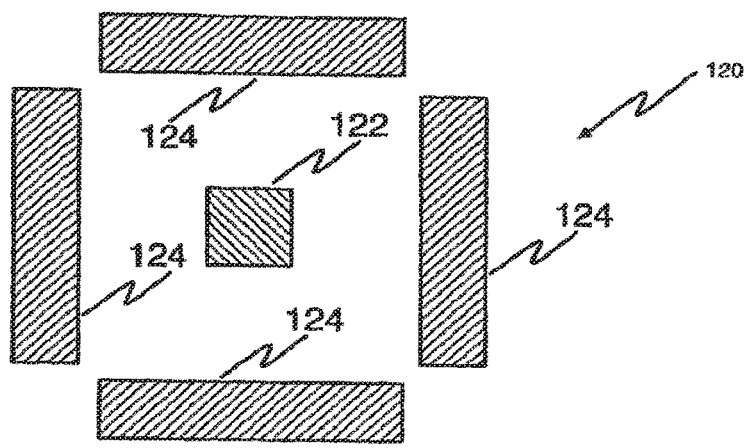
FIG. 3 is an illustrative mask layout for a photomask that may be used in etching the front side of the wafer in the process of FIGS. 2A through 2H.

Referring now to FIG. 3, a typical mask 120 for use in processing the front side 12 of the wafer 10 is shown. This mask is used in the process of FIG. 1B. This mask has a central aperture 122 for the target and four release windows 124 at the periphery. The central aperture 122 is used to form target window 20 shown in FIG. 1B. The release windows 124 allow individual ones of the freestanding pyramid-shaped targets to be separated from each other after the completion of processing and are used to form release-tab windows 22 shown in FIG. 1B.

Figure 4:
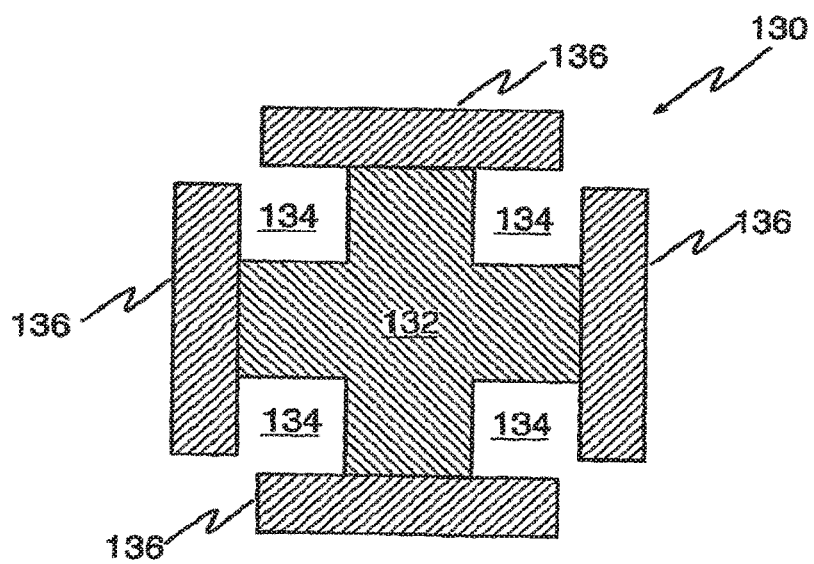
FIG. 4 is an illustrative mask layout for a photomask that may be used in etching the back side of the wafer in the process of FIGS. 2A through 2H.

Referring now to FIG. 4, a typical mask 130 for use in processing the back side 12 of the wafer 10 is shown. This mask is used in the etching process described with reference to FIG. 1E. This mask has a first aperture 132 for the target and four release windows 134 at the periphery. The first aperture 132 is used to define support members that will be formed in locations 134 to form a frame for the free-standing target. The release windows 136 allow individual ones of the free-standing pyramid-shaped targets to be separated from each other after the completion of processing and are used to form etch windows that will join the etched voids defined by release-tab windows 22 shown in FIG. 1B.

Figure 5A:
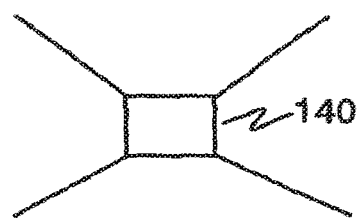
FIGS. 5A through 5D are schematic representations of an etching progress that can be used to create a pyramidal void.
Figure 5B:
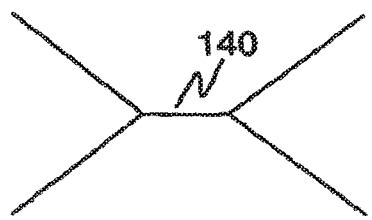
Figure 5C:
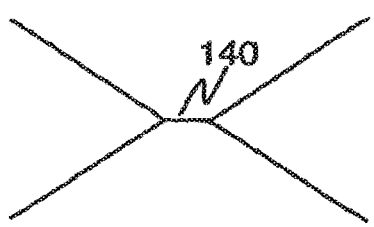
Figure 5D:
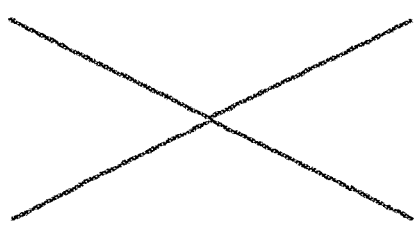

Referring now to FIGS. 5A through 5D, schematic representations of the etching progress to form a pyramidal void through target aperture 20 are shown. First, at FIG. 5A, an under-etch condition is shown in which a portion of the <100> plane 140 can still be seen. Next at FIGS. 5B, and 5C the portion 140 of the <100> that remains becomes progressively smaller. FIG. 5B has utility in that by purposely extending the plane of 140 more of a trough shaped target is obtained which may be of interest. Finally, FIG. 5D shows an ideal etch-progress condition in which the etch has proceeded to such an extent that the <100> plane has been etched away, resulting in the perfect intersection at a point of the planes comprising the pyramidal surfaces of the completed etch pit.

Referring now to FIGS. 6A through 6F, cross sectional diagrams show the progressive processing for forming targets according to another aspect of the present disclosure.

Figure 6A:
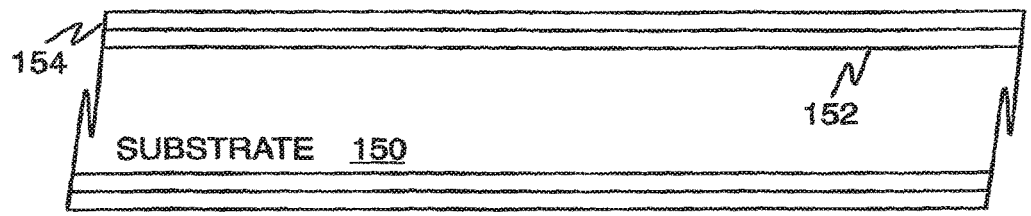
FIGS. 6A through 6F are cross sectional diagrams illustrating a process for forming targets according to another aspect of the present disclosure.

First, as shown in FIG. 6A, the process begins with a double polished <100> silicon substrate 150. A substrate of <110> silicon will work as well. A film 152 of $SiO_2$, then, optionally, a film of silicon nitride 154 is formed on the substrate 150 using standard LPCVD (Low Pressure Chemical Vapor Deposition) techniques. A thickness of about 1,000 angstroms has been found to be suitable for these layers 152 and 154, although other thicknesses could be employed. For example, an alternative embodiment employs a silicon dioxide mask of at least about 4 μm. FIG. 6A shows the structure resulting after these processing steps have been performed.

Figure 6B:
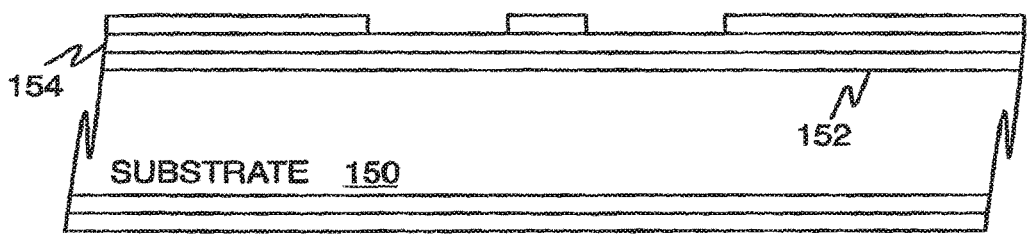

Referring now to FIG. 6B, a cross-shaped opening with a circular plug in the center (see FIG. 7) is patterned on the surface of the silicon nitride layer 154 using standard photolithography techniques. A dimension of about 1 mm on all sides has been found to work well for a 5 mm×5 mm die size with a circular feature having a diameter of about 400 μm. Standard etching techniques such as a nitride/oxide dry etch techniques are then performed to clear the $SiO_2$ and silicon nitride layers 152 and 154 from the large cross-shaped window 156 down to the silicon substrate 150, leaving the circular plug 158 in the center. FIG. 6B shows the structure resulting after these processing steps have been performed.

Figure 6C:
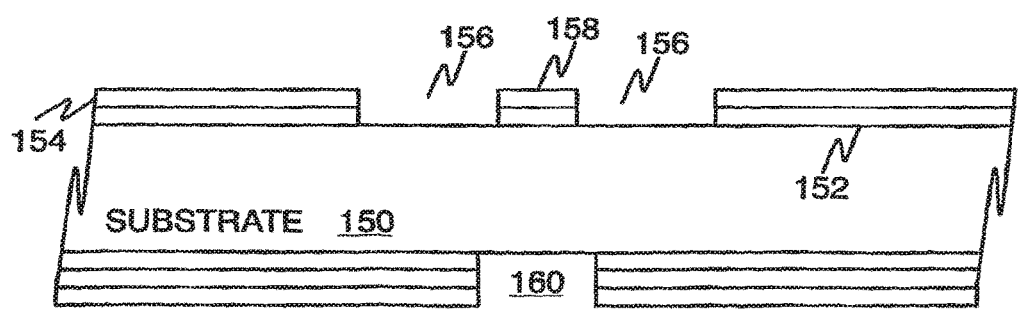

Referring now to FIG. 6C, a square opening 160 (having, for example, a dimension of about 400 µm per side) is patterned on the backside of the silicon wafer 150 using standard photolithography techniques. Then standard etching techniques, such as nitride/oxide dry etch techniques, may be performed to remove the $SiO_2$ and silicon nitride layers 152 and 154 to clear the window. This window provides the opening when etching back the remaining silicon mold to create a free-standing device. FIG. 6C shows the structure resulting after these processing steps have been performed.

Figure 6D:
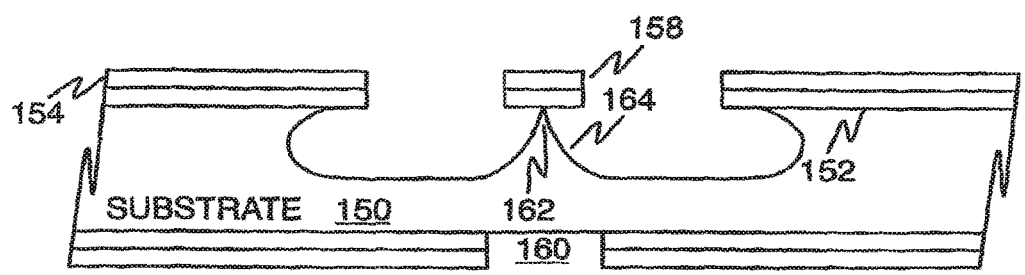

Referring now to FIG. 6D, an etching process such as an isotropic dry etch is performed until all sides converge at the tip making an outer cone or pointed silicon mold. The isotropic etch will allow undercutting along all sides of the circle, eventually forcing all sides to converge to a point 162 and forming a cone or pointed mold 164. A depth of greater than about 400 µm is typically used. A perfect isotropic etch will have the same etch rate in the vertical direction as the horizontal direction (ratio: 1:1). One suitable dry etch chemistry is $XeF_2$. A suitable etcher with etch rates of up to 10 µm/min is available from Xactix, Inc., of Pittsburgh, Pa. In further embodiments, the etch is performed using an STS etcher and eliminating the passivation step. FIG. 6D shows the structure resulting after these processing steps have been performed.

After the cone or pointed mold is defined, standard oxide sharpening techniques such as oxide enhanced sharpening may be performed to create a sharper tip. In a particular example, the tip sharpening technique involves dry thermal oxidation (for example, at about 1000° C. for about an hour), such as to add about 1500 Å of silicon dioxide, followed by a HF etch. This process can be repeated, as desired, to achieve a particular tip sharpness or sidewall roughness.

Figure 6E:
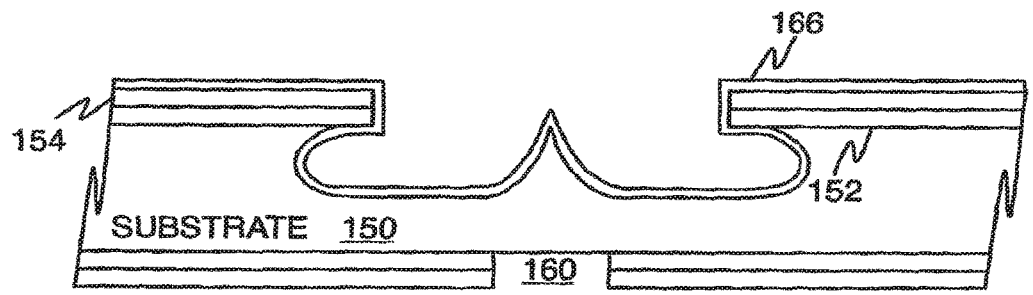

Referring now to FIG. 6E, a layer 166 of the desired target metal is deposited to a desired thickness on top of the silicon cone or pointed mold 164. The thickness of metal layer 166 is typically greater than about 1.5 µm if a freestanding metal target is desired. In particular examples, 10 µm of a metal such as gold or the other materials disclosed herein are deposited. FIG. 6E shows the structure resulting after these processing steps have been performed.

Figure 6F:
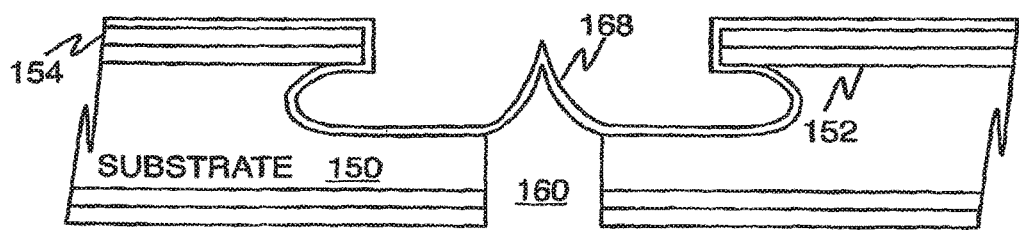

Referring now to FIG. 6F an etch back process is performed on the back side of the substrate 150 to eliminate the silicon mold 164 to create a free-standing metal structure 168. This can be done using a wet or dry etch. The $SiO_2$ layer is used as the preferred masking layer for the $XeF_2$ dry etch and the Silicon Nitride layer is the preferred masking layer when performing the wet etch. If a wet etch is not used for the etch back step, then silicon nitride layer 164 is not necessary and may be skipped during the steps shown in FIGS. 6A-C.

In further embodiments, the backside of the silicon wafer is etched prior to applying the front side mask.

Figure 7:
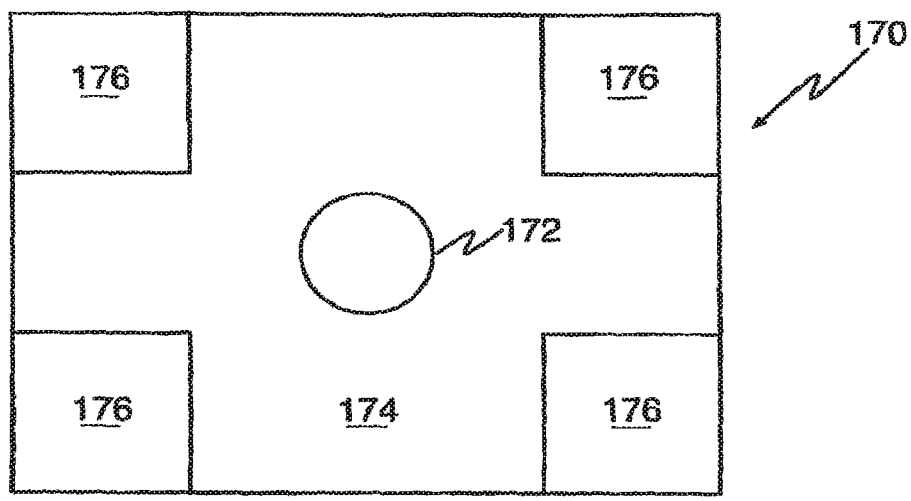
FIG. 7 is an illustrative mask layout for a photomask that may be used in etching the back side of the wafer in the process of FIGS. 6A through 6F.

FIG. 7 is an illustrative mask layout for a photomask 170 that may be used in etching the back side of the wafer to form the target shown in FIGS. 6A through 6F. Circular portion 172 is used to form circular plug 158. A cross-shaped aperture 174 is defined by four corner features 176.

Hemispherical Targets

Certain embodiments of the present disclosure provide hemispherical laser targets. The following discussion provides an example of how such targets may be fabricated. Additional construction details, including parameters for varying the diameter and radius of curvature of the target, can be found in Fletcher et al., "Microfabricated Silicon Solid Immersion Lens," *J. Microelectromechanical Sys.* 10(3), 450-459 (September, 2001), and Strzelecka, "Monolithic Integration of VCSELs and Detector with Refractive Microlenses for Optical Interconnects" (1997) (Ph.D. Dissertation on file with the UC Santa Barbara Library), both expressly incorporated by reference herein. As shown in FIG. 8A, a silicon wafer 210 is coated on both front side 206 and the backside 208 with a layer of silicon nitride 216. The silicon wafer 210 is spun, exposed, and developed with a coating, such as a 7 µm or 1.6 µm thick coating, of photoresist 218, such as Shipley 3612 or 220 photoresist. In particular examples, the silicon wafer 210 is first primed with HMDS and softbaked at 90° C. after the photoresist has been applied.

A suitable backside mask is created and standard photolithographic techniques are used to create a central aperture 220 and two flanking alignment marker apertures 222, shown in FIG. 8B. For example, wafer 210 can be exposed to the mask twice for about 3.75 seconds for each exposure. In some examples, the wafer 210 is developed with LDD26W and then postbaked at about 110° C. The apertures 220, 222 are created, in some examples, by etching the nitride layer using a RIE process, such as for about 9 minutes, followed by an STS etch for about 2 hours at an etch rate of about 1.8 µm/minute, such as about 1 µm/minute or less. In at least certain examples, the entire wafer 210 is exposed, such as for about 15 minutes, prior to the STS etch. In a particular example, the apertures 220, 222 are etched to a depth of about 420 µm.

With reference now to FIG. 8C, the backside photoresist 218 and any organics are stripped, such as using 9:1 $H_2SO_4$: $H_2O_2$ for about 20 minutes, and the front side 206 of the silicon wafer 210 is spun and exposed with photoresist 226, such as a 10 µm coating of PMGI photoresist (available from MicroChem, Corp. of Newton, Mass.) or a 7 µm coating of Shipley 3612 (which may be preceded by a HMDS prime and followed by a postbake at 90° C.). In a particular example, the silicon nitride on the front side 206 is first removed, such as by using a RIE etch for about 20 minutes. The front side 206 of the wafer 210 is exposed with a suitable front side mask to create a central target 228, flanking apertures 230, and frame sides 234. For example, the front side mask may be exposed twice at about 3.6 seconds per exposure. In a particular example, each target 222 is surrounded by four frame sides 226. The frame sides 226 have a relatively large surface area compared to the target 222 and can be used to protect the target 222.

The front side 206 of the wafer 210 is developed, as illustrated in FIG. 8D, and etched, illustrated in FIG. 8E. In a particular example, the front side 206 is etched using a dry etch process, such as a RIE reactive ion etching (REI) process, to etch approximately 1 µm of the wafer 210. An example of suitable etching conditions is a 20 minute etch at an etch rate of about 3000 Å/minute for silicon and about 300 Å/minute for photoresist.

Figure 8F:
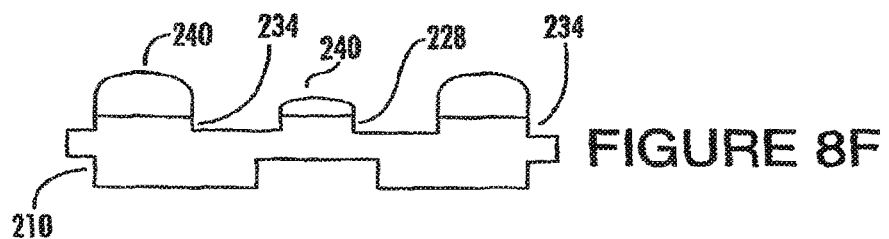
Figure 8G:
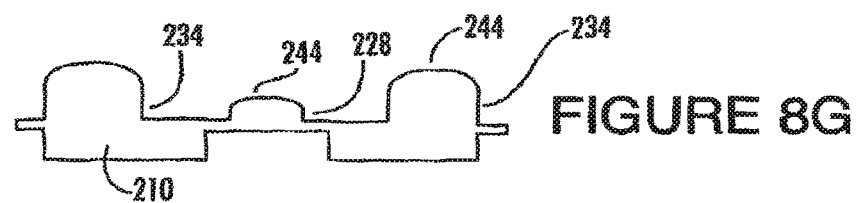

Next, the wafer 210 is treated with an acetone reflow step, creating hemispherical domes 240 over the target 228 and the frame sides 234, shown in FIG. 8F. The front side 206 is then dry etched, such as with a 1:1 Si:photoresist etch ratio until the photoresist has been removed. In a particular example, an etch of about 20 µm is sufficient to remove the photoresist. As shown in FIG. 8G, both the frames 234 and the target 228 are left with hemispherical domes 244. The target dome 228 is shorter than the frame domes 234, due to the greater surface area of the frames 234. Thus, the target dome 228 is protected by the taller frame domes 234. In some examples, the wafer 210 is then hardbaked, such as at about 90° C. for about one hour. In a further method, the front side 206 is not etched following the acetone reflow, and instead the remaining resist is hardened and metal is formed on the domes 240 using any suitable technique.

Figure 8H:
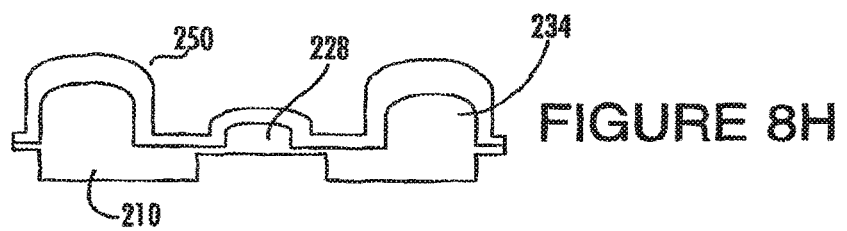

Now that the target mold 228 has been formed, one or more metal layers 250 can be formed on the front side 206 using any suitable technique, such as E-beam evaporation or sputter coating. An adhesion layer, such as a Ti adhesion layer, can be used if desired. In a particular example, 10 µm of Au is deposited onto the front side 206. In a more particular example, about 2 µm of Au/Ti is first applied using E-beam evaporation and then an additional 8 µm of Au is applied by sputtering. The resulting metal coated structure is shown in FIG. 8H.

Figure 8I:
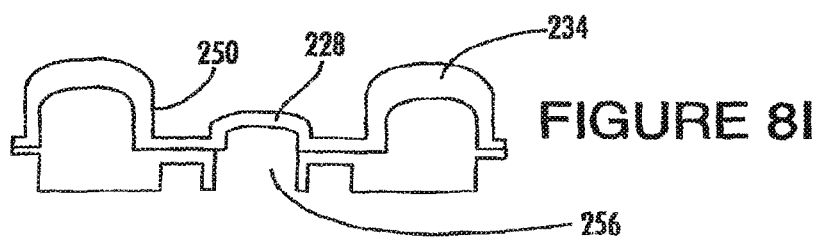

As shown in FIG. 8I, the silicon underlying the target 222 can then be removed by etching, such as using a KOH wet etch (such as 33% KOH for about 90° C. for about 40 minutes), to create a freestanding target 222 defining a cavity 256.

Figure 9A:
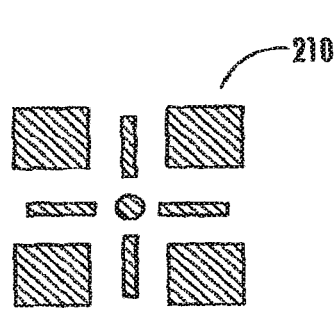
FIGS. 9A and 9B are, respectively, front side and backside masks that can be used in the process of FIGS. 8A through 8I.
Figure 9B:
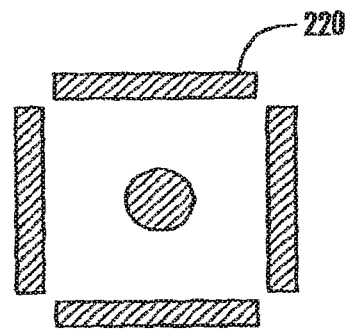

FIGS. 9A and 9B illustrate front side 310 and backside 320 masks that can be used in the above described process. The front side mask 310 includes square frame masks 312, rectangular alignment masks 314 vertically and horizontally disposed between each of the square frame masks 312, and a central circular target mask 316. The backside mask 320 includes rectangular frame masks 324 and a central circular target mask 328.

Flat-Top Targets

In some embodiments, it may be useful to provide a relatively large surface area to which a laser is directed. The surface area can act as a proton or ion source. In addition, the larger surface can be more uniform than a narrow point, which can allow a generated plasma to be more fully characterized.

Figure 10:
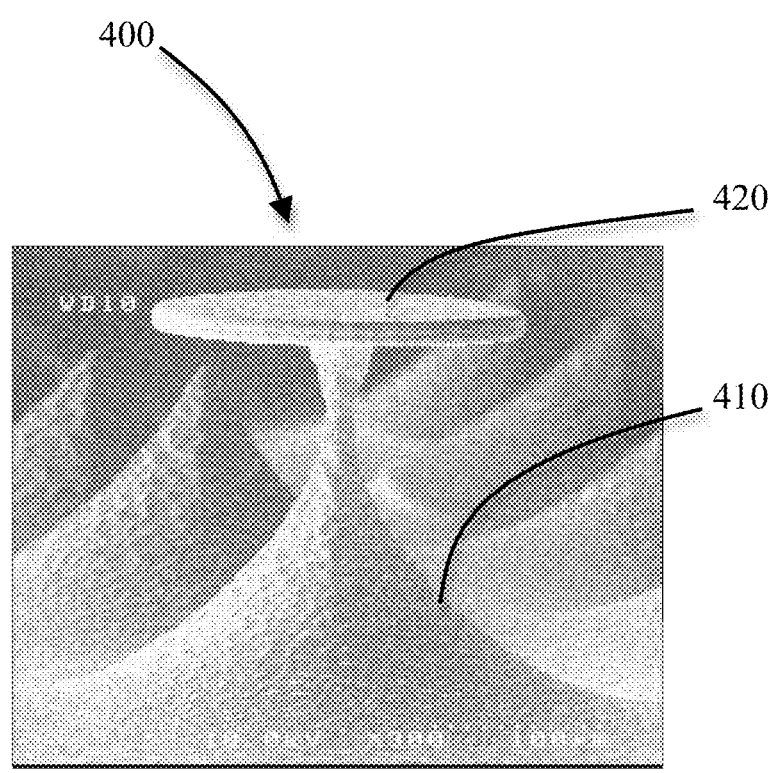
FIG. 10 is an electron micrograph of a flat topped target according to the present disclosure.

FIG. 10 illustrates a disclosed laser target 400 having a conical section 410 and a circular flat top 420. The dimensions of the conical section 410 and flat top 420 can be varied as desired. In some examples, the conical section 410 has a diameter of at least about 150 µm. The conical section 410 has a diameter of about 300 µm in a specific example. The flat top 420, in particular examples, has dimensions that are proportional to the base of the conical section 410. The flat top 420 can be of various shapes, including square, rectangular, triangular, trapezoidal, parallelogram, pentagon, hexagon, cross, circular, elliptical, or free form or arbitrary shapes and can be hollow or solid. Although section 410 is shown as conical, other shapes can also be used.

The conical section 410 and the flat top 420 can be made of the same or different materials, including metals such as Au, Al, Cu, Mo. The flat top 420, in some examples, is made of a single material. In further examples, the flat top 420 is made of multiple materials. For example, in a specific example, the flat top includes a middle Al layer sandwiched by Au layers.

Figure 11A:
FIGS. 11A through 11G are cross sectional diagrams illustrating a process for forming the flat topped target of FIG. 10.

FIGS. 11A-11G illustrate a process for creating a capped target, such as the target 400 of FIG. 10. As shown in FIG. 11A, standard deposition techniques, such as thermal oxide deposition or low pressure chemical vapor deposition (LP-CVD) are used to deposit a film of silicon dioxide 510 on the front side 514 and backside 516 of a double polished silicon substrate 508. In a particular example, at least about 3 µm, such as at least about 4 µm, of silicon dioxide 510 is deposited. The silicon wafer substrate 508 can be of any desired crystallography, such as a <100> wafer. In further implementations, the mask material is changed from silicon dioxide to other materials, such as nitrides or metals.

Figure 11B:
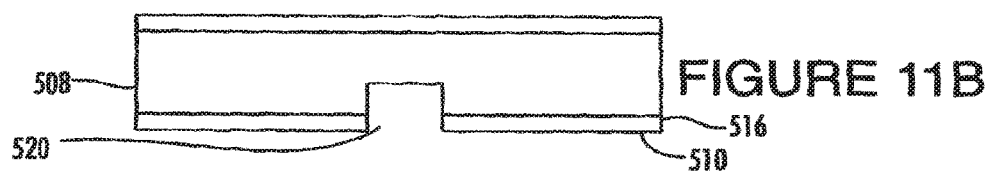

As shown in FIG. 11B, standard photolithography techniques are used to pattern a desired shape, such as a circle or square, in the backside 516 of the wafer 508. In a particular example, 4 µm of Shipley 220 photoresist is applied after a HMDS prime. The wafer 508 is then soft-baked at 90° C., exposed with the mask for about 4.4 seconds, developed with LDD26W developer, and post-baked at about 110° C.

A deep anisotropic etch is performed to create an opening 520 approximately halfway into the wafer 508, such as by using a plasma etch at about 3000 Å/minute and then an STS etch at about 2 µm/minute. This deeply etched aperture 520 can help the release of the final target.

Figure 11C:
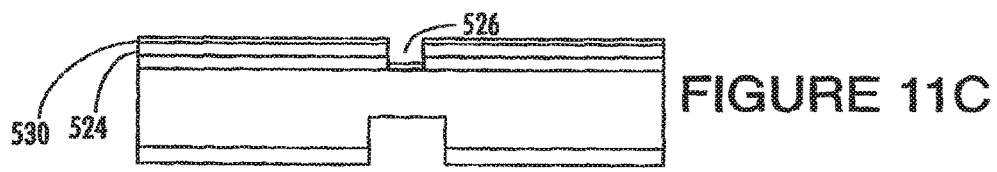

Standard photolithography techniques are used, as shown in FIG. 11C, to create the desired size and shape of the flat foil, or flat top 420 (FIG. 10). For example, the front side 514 can be coated with a layer of photoresist 524, developed, and etched to create an opening 526. For example, about 12 µm of SPR 220 photoresist can be applied after an HMDS prime, and then the wafer postbaked at 90° C., cured for 4 hours, and then exposed to the mask for 4 iterations of 3.3 seconds each. The wafer 508 can then be developed using LDD26W developer and then postbaked at about 110° C.

The opening 526 is created, in some examples, using a plasma etch, such as a 4 µm etch at about 3000 Å/minute. In at least certain examples, the outer mask is proportional to the base of the material that will become the conical section 410. The outer mask allows the dimensions of the conical section 410 to be controlled independently from the dimensions of the flat foil 320.

Figure 11D:
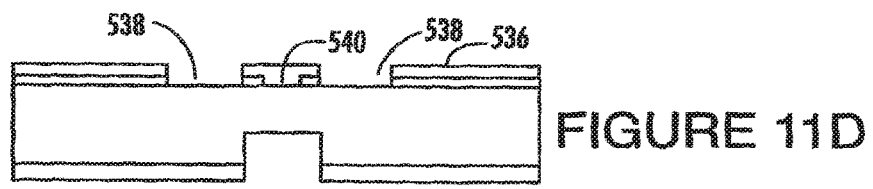

One or more metals layers 530, such as layers Au or Al, can be deposited into the flat. The layers 530 may have the same or different shapes, size, or thickness. In a particular example, the flat top is a circular plug of Al. Standard lift off techniques are then used to remove extraneous metal. FIG. 11D illustrates the wafer 508 after the lift off technique has been applied and a layer of photoresist 536 has been applied and exposed to create apertures 538 flanking the metal layer 540.

Figure 11E:
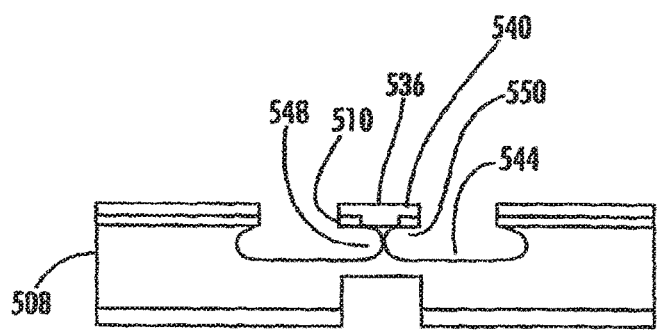

FIG. 11E shows the wafer after a deep isotropic dry etch has been performed, such as by disabling the passivation step of a standard Bosch process (using little to no $CHF_3$), such as at about 2 µm/minute. The etch process is stopped short to avoid completely etching away the end cap and creates cavities 544 flanking a cone structure 548 supporting a flat surface 550 on which the metal layer 540, silicon dioxide layer 510, and photoresist layer 536 rest.

Figure 11F:
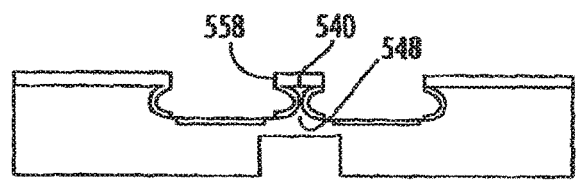

The remaining photoresist 536 is removed, such as with acetone or 9:1 $H_2SO_4$:$H_2O_2$. The remaining mask material 510 is then removed, such as with a dry etch, such as an $O_2$ dry etch. As shown in FIG. 11F, an hour-glass mold 548 of silicon is left with a metal top 540. A layer 558 of one or more desired target metals, or other target materials, such as Au, is then deposited, such as by sputtering. In a particular example, 10 µm of Au is sputtered onto the mold 548. An adhesion layer, such as Ti, may be used if desired.

Figure 11G:
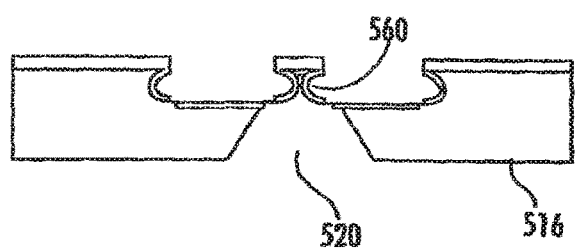

Finally, as illustrated in FIG. 11G, the silicon is etched out of the cone structure 560, such as by using a KOH etch (for example, 33% KOH at about 100° C. for about 3 to 4 hours) through the opening 520 in the backside 516 of the wafer 508. In at least certain examples, the wafer 508 is over-etched to completely remove silicon from the cone structure 560. The wafer 508 can then be KOH decontaminated and stripped of organics, such as by treatment with 5:1:1 $H_2O$:$H_2O_2$:HCl and 9:1 $H_2SO_4$:$H_2O_2$ for about 20 minutes each at about 70° C. and about 120° C., respectively.

Figure 12A:
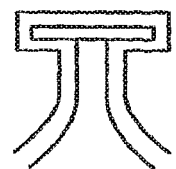
FIGS. 12A through 12D illustrate various types of caps or tops that may be used in capped targets according to the present disclosure.
Figure 12B:
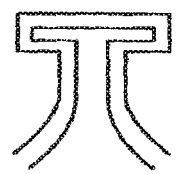
Figure 12C:
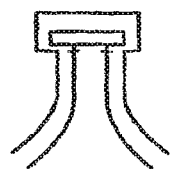
Figure 12D:
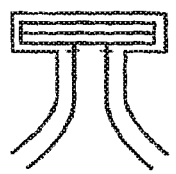

Although FIG. 10 illustrates a flat foil 420 that encapsulates mask material, other types of top structures can be implemented using the disclosed techniques. A number of such structures are shown in FIGS. 12A-12D. FIG. 12A illustrates a top according the procedure described with respect to FIGS. 11A-G having an encapsulated material. The top shown in FIG. 12B includes a hollow top, the mask material having been removed, such as through a backside etch process. FIG. 12C illustrates a top formed by etching a portion of the mask material prior to encapsulating the target. This process results in a smaller top since a smaller amount of material is capsulated. This smaller top can be hollowed in a manner similar to that for FIG. 12B. FIG. 12D illustrates an embodiment where multiple materials are encapsulated. In some embodiments, the additional material serves as an etch mask. In further embodiments, the additional material is left after the etch mask is removed.

Figure 13:
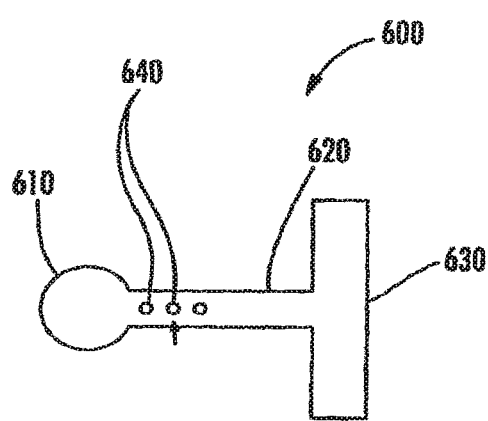
FIG. 13 is a top plan view of an embodiment of a capped target according to the present disclosure that is linked by a structural connection to a base piece.

FIG. 13 illustrates a top plan view of a further embodiment of a target 600 having a top 610. The top 610 has a horizontal structural connection 620 that connects the target 600 to a base piece 630. The base piece 630 may aid in handling and positioning the target 600. Holes 640 can be etched into the structural connection 620 in order to minimize changes in the target 600 shape due to the structural connection 620.

The disclosed targets can provide a number of advantageous. For example, the lithographic techniques used to produce the target may allow many targets to be fabricated and fabricated with consistent properties. Accordingly, the present disclosure may allow targets to be constructed less expensively than using prior techniques. Because of the potentially lower cost, or greater numbers of targets that can be made, such methods may allow the targets to be used in more applications, as well as potentially increasing the quality or quantity of data available from target experiments. In further implementations, the targets can be fabricated with a surrounding support that can help protect the target from damage and aid in handling and positioning the target.

In particular implementations, the disclosed targets can be manufactured with a sharp or narrow tip, such as a tip of approximately the same width as the wavelength of a laser to be used with the target. In particular examples, the width of the target tip is about 1 μm or smaller. Such tips can result in enhanced energy production. Similarly, the present disclosure can provide targets, and methods of forming such targets, having approximately the same size as the spot size of a laser used to shoot the target. Because of the closer size match between the laser and the target, the target shape may be used to affect the results of the target-laser interaction.

Some aspects of the present disclosure provide free standing targets. Free standing targets may produce greater energy and allow for more accurate characterization of resulting plasmas if a substrate does not interfere with the interaction of the laser and target.

Further aspects of the present disclosure provide hemispherical targets. The hemispherical targets can be produced with known lens diameters and radius of curvatures, which can aid in positing the targets and objects with respect to the target. Control of the fabrication conditions allows the target characteristics to be tailored to a particular application.

Capped targets, such as cones capped with a flat top, are provided by some embodiments of the present disclosure. The cap of such targets can provide a larger surface for the laser to contact after being guided by the remainder of the target. The larger surface may be used to produce more energy, or more or different types of radiation. Adjusting the composition of the target or cap can allow a desired energy profile to be obtained from the target. For example, the cap can be created with multiple metals, which may have the same or different shape, size, or thickness. In some examples, the cap has concentrically arranged metal layers. In further examples, the cap has a layer of metal on which another metal is patterned, such as in a polka-dot pattern.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

What is claimed is:

1. A structure for facilitating proton generation, the structure comprising:
    a substrate having a front side and a back side;
    a first aperture located in the front side of the substrate;
    a second aperture located in the back side of the substrate; and
    a laser target located in the first and second apertures, the laser target configured to emit protons when irradiated by an irradiating laser;
    wherein the laser target has a convex tip and a concave opening, the concave opening complementary to the convex tip; and
    wherein a trough of the concave opening has a lateral dimension approximately equal to a characteristic wavelength of the irradiating laser.

2. The structure of claim 1, wherein the substrate comprises at least one of: a semiconductor material and an insulator material.

3. The structure of claim 1, wherein the lateral dimension of the trough of the concave opening is less than 10 μm.

4. The structure of claim 3, wherein the lateral dimension of the trough of the concave opening is less than 1 μm.

5. The structure of claim 1, wherein a mouth of the concave opening has a lateral size approximately equal to a spot size of the irradiating laser.

6. The structure of claim 1, wherein the laser target comprises at least one of Au, Pt, Cr, Cu, Pd, Ta, Ag, Ti, W, silicon nitride, a polymer, and polysilicon.

7. The structure of claim 1, wherein the laser target is formed by at least one process selected from the group consisting of chemical vapor deposition, evaporation, spin coating, and electroplating.

8. The structure of claim 1 comprising a plurality of the laser targets.

9. The structure of claim 8, wherein the laser targets are arranged in an array.

10. The structure of claim 8, wherein the laser targets are operatively coupled to one another.

11. The structure of claim 1, wherein the laser target is circumscribed by a protective frame.

12. The structure of claim 11, wherein the protective frame is configured to facilitate manipulation of the laser target relative to the irradiating laser.

13. The structure of claim 1, wherein the laser target comprises a cap coupled to an apex of the convex tip.

14. The structure of claim 13, wherein the cap is substantially planar and orthogonal to the apex of the convex tip.

15. The structure of claim 1, wherein the convex tip is located within the first aperture, and wherein the concave opening is located within the second aperture.

16. The structure of claim 1, wherein the convex tip is located within the second aperture, and wherein the concave opening is located within the first aperture.

17. The structure of claim 1, wherein the concave opening is defined by a conic void.

18. The structure of claim 17, wherein the conic void is a pyramidal void.

19. The structure of claim 1, wherein the laser target comprises a first material and a second material, the first material differing from the second material.

20. The structure of claim 19, wherein at least one of the first material and second material comprises a metal.

21. The structure of claim 1, wherein the convex tip and the trough of the concave opening are both substantially hemispherical.

* * * * *